(12) United States Patent
Skinner

(10) Patent No.: US 6,343,538 B1
(45) Date of Patent: Feb. 5, 2002

(54) MULTIPOSITION SELF-LOCKING CYLINDER

(76) Inventor: Frank Raymond Skinner, 3302 S. New Hope Rd., Bldg 300-A, Gastonia, NC (US) 28056

(*) Notice: Subject to any disclaimer, the term of this patent is extended or adjusted under 35 U.S.C. 154(b) by 0 days.

(21) Appl. No.: 09/183,347

(22) Filed: Oct. 30, 1998

Related U.S. Application Data

(63) Continuation-in-part of application No. 08/510,822, filed on Aug. 3, 1995, now Pat. No. 5,829,811.
(51) Int. Cl.⁷ ................................................ F15B 15/26
(52) U.S. Cl. ..................... 92/18; 92/19; 92/23
(58) Field of Search ................................ 92/18, 19, 23, 92/24, 27

(56) References Cited

U.S. PATENT DOCUMENTS

RE25,334 E  *  2/1963  Michalak ........................ 92/14
3,320,861 A  *  5/1967  Johnson et al. ................. 92/18

* cited by examiner

*Primary Examiner*—Edward K. Look
*Assistant Examiner*—Thomas E. Lazo
(74) *Attorney, Agent, or Firm*—Dougherty & Clements LLP

(57) ABSTRACT

A self-locking cylinder capable of restraining substantially infinite force including: an angular or conical surface; a locking part; a release part; a force surface for establishing locking forces; a plurality of cylindrical or spherical parts such that the mechanism is capable of moving and locking and releasing JAW means at more than one discrete point with a maximum of one motor means operatively attached to each of said JAW means.

18 Claims, 17 Drawing Sheets

Fig.1
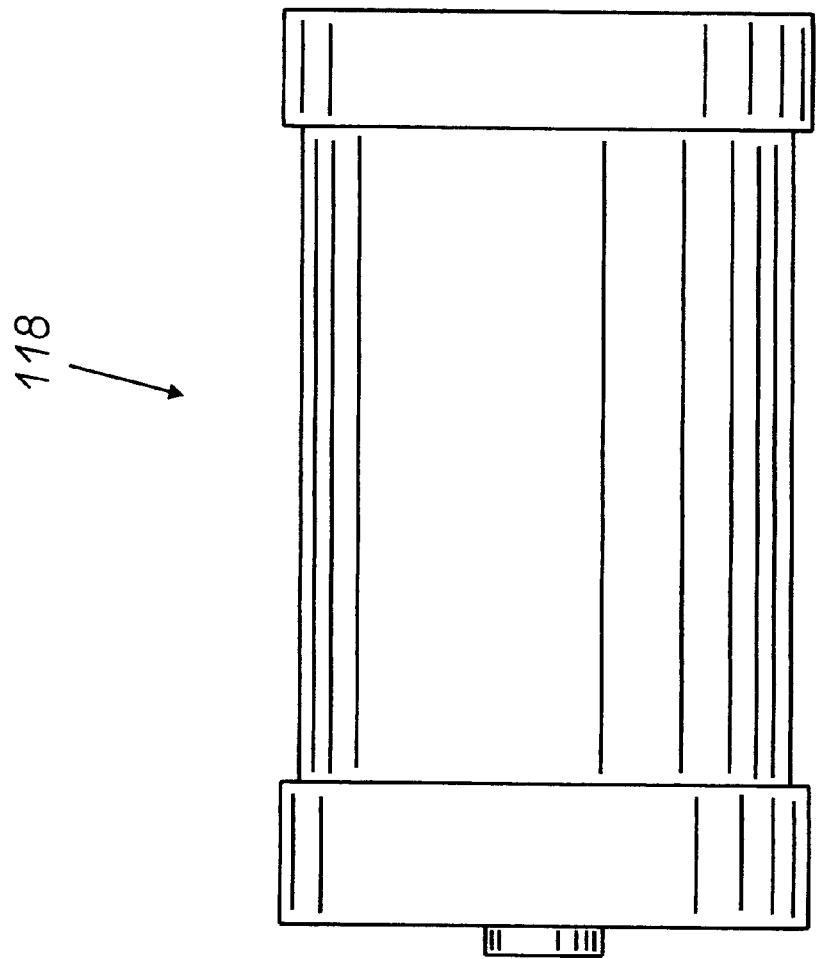
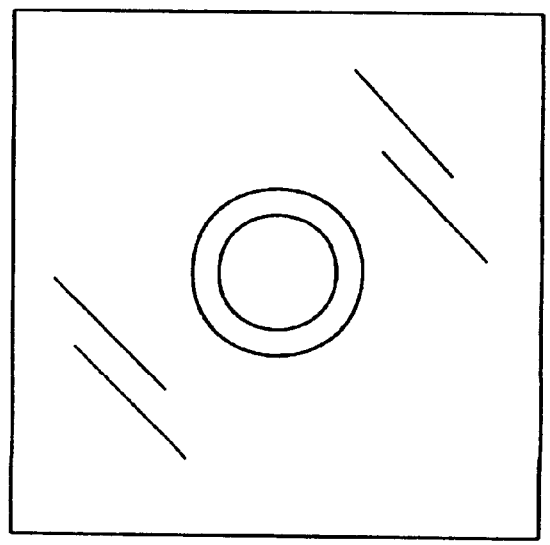

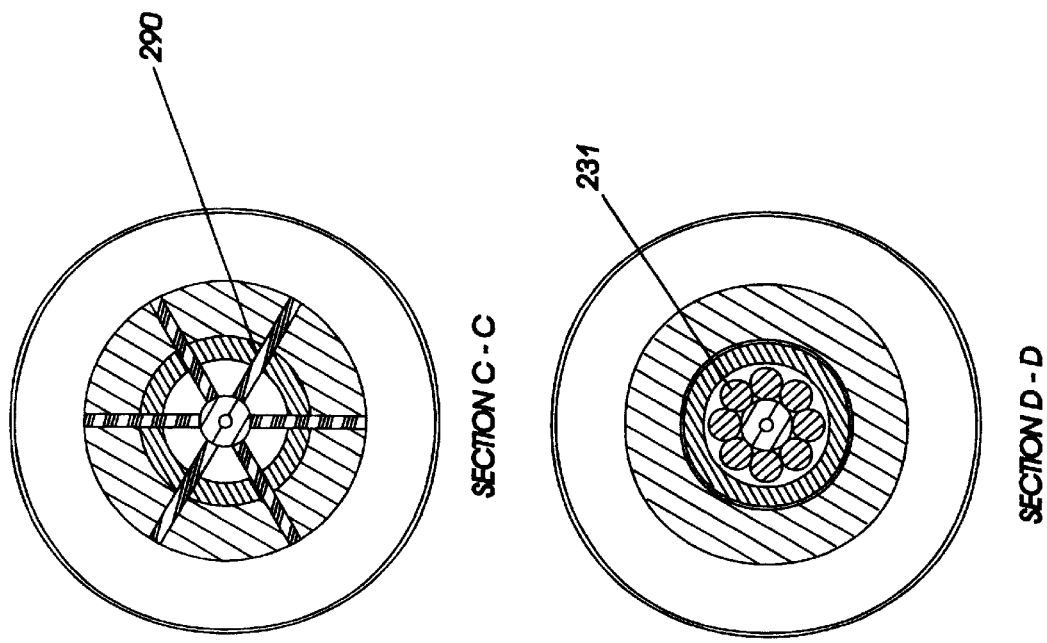
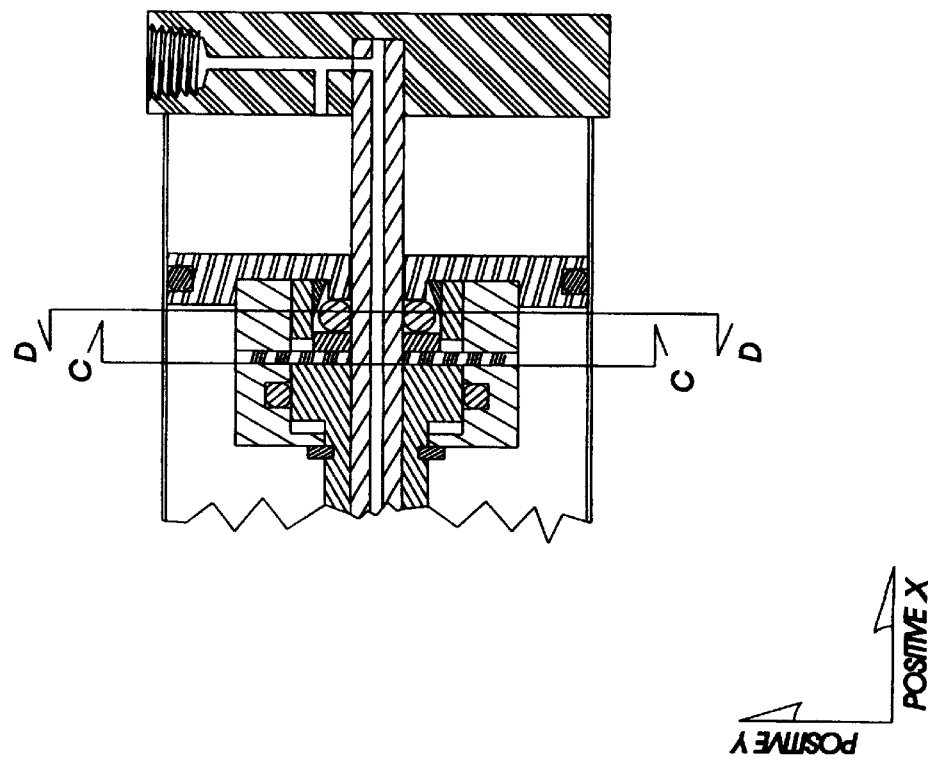
Fig. 5

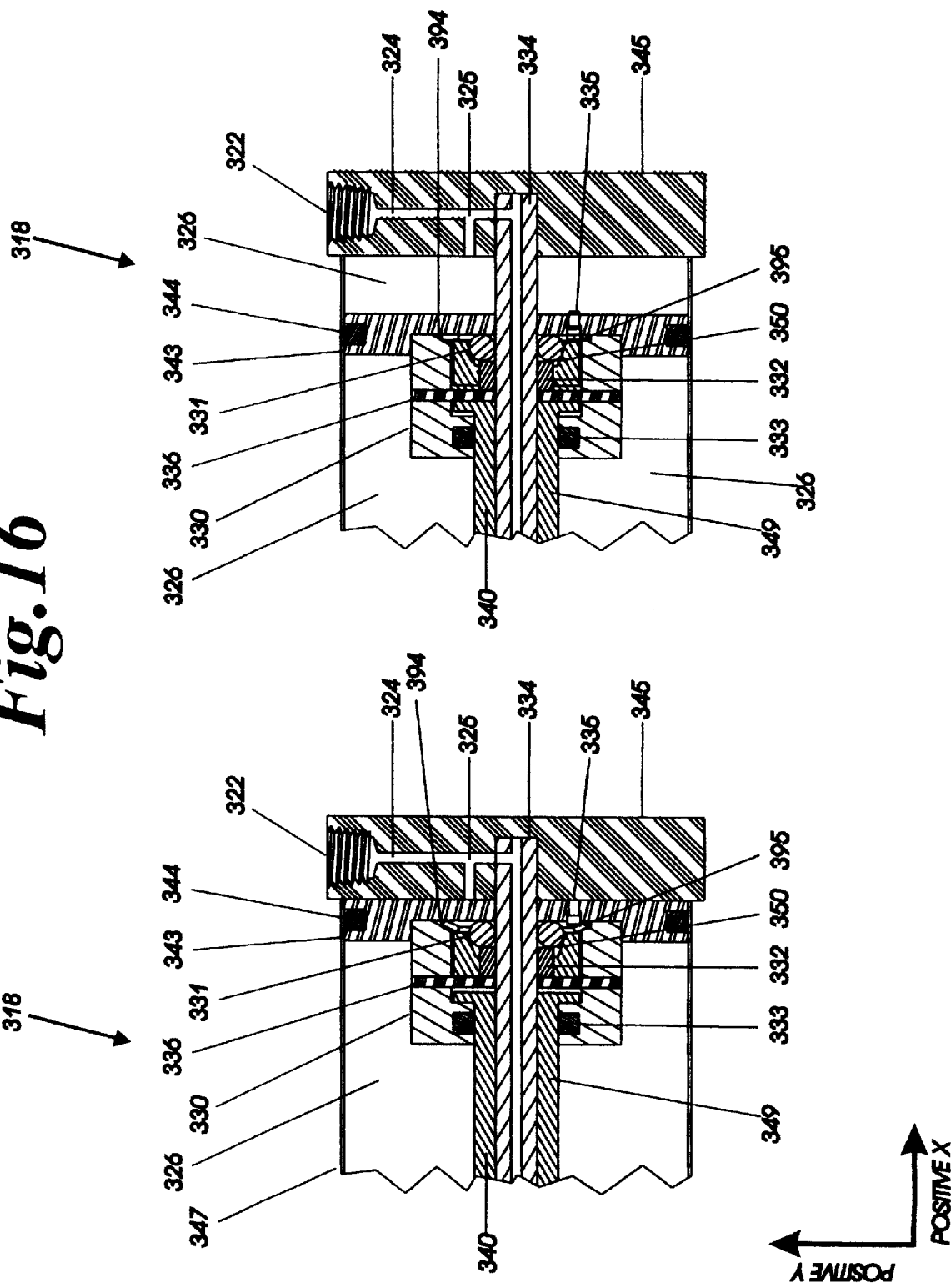

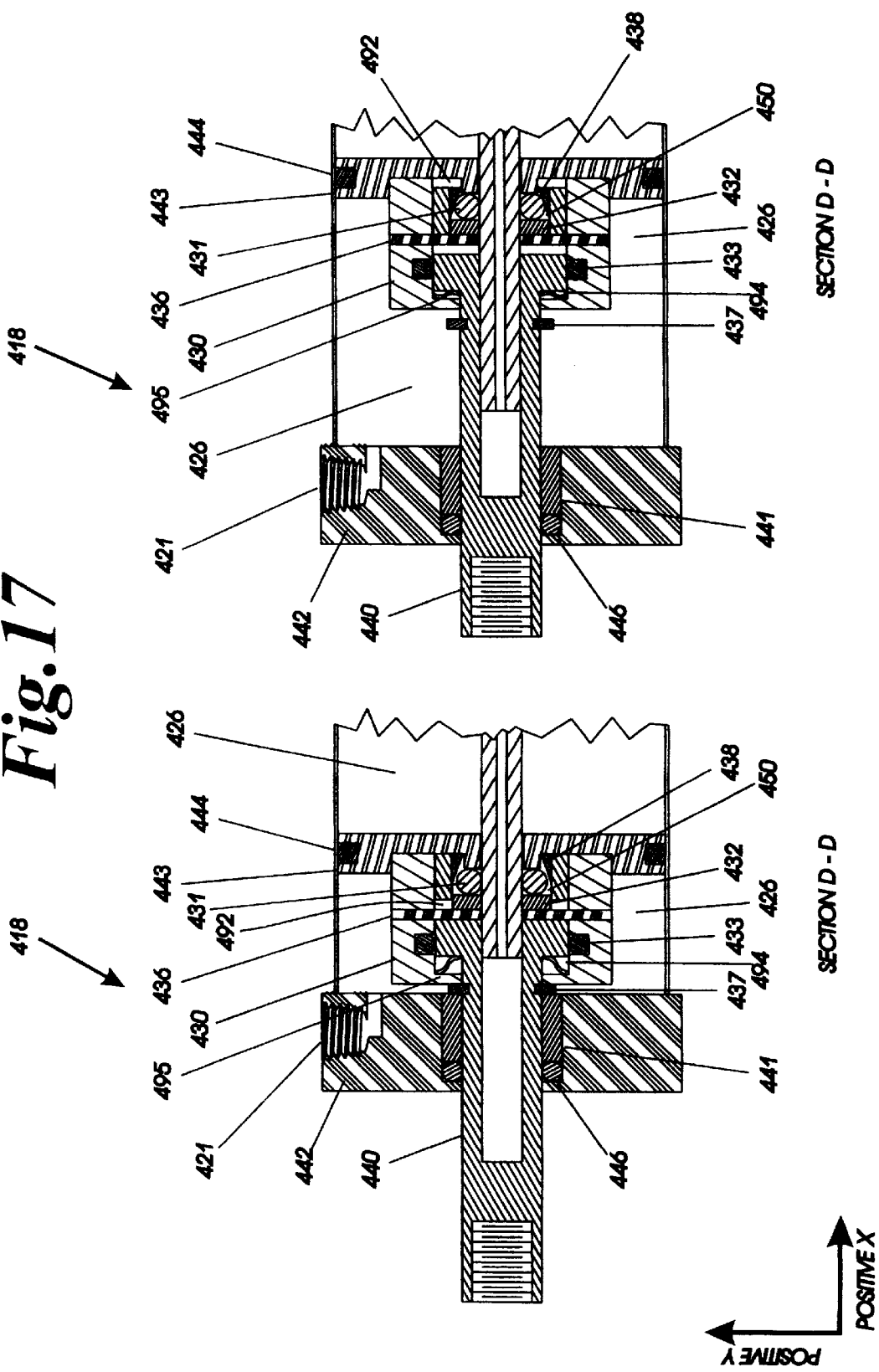

MULTIPOSITION SELF-LOCKING CYLINDER

This application is a continuation-in-part of our U.S. patent application Ser. No. 08/510,822, filed Aug. 3, 1995 now U.S. Pat. No. 5,829,811.

BACKGROUND OF THE INVENTION

This invention relates to an improvement in the design of the "multiposition self-locking gripper". The Multiposition self-locking gripper is an important discovery that allows a gripping or clamping mechanism to close and lock on objects of varying sizes. However, by incorporating the self locking mechanism into the operating space of a cylinder, it was discovered that the principal of the Multiposftion self-locking cylinder could indeed be applied to the entire product line. It was further discovered that this "Multiposition Force Locking Cylinder" could be used as a motor mechanism on numerous mechanical devices requiring self locking principles.

A cylinder is defined as a motor device, and is frequently composed of a piston, moving rod, and a substantially cylindrical containment. The containment and the piston normally include seals and bearing surfaces. A cylinder must be operated by the input of a fluid substance. The two most frequently used fluids are air and oil. Air cylinders are very inexpensive and relatively maintenance free.

For many years product and machinery users have been searching for a cylinder that would allow them to close/open and lock on parts of various sizes. Fluid power specialists designed fluid devices with check valves to inhibit the release of a fluid. However, pneumatic fluid remains compressible and, therefore, does not lock the motion of the cylinder. Hydraulic devices would eventually release the high pressure fluid into a low pressure containment and the mechanical force of the cylinder device would reduce to zero. Heat, high force and long periods of time would cause these devices to release the payload object.

Mechanisms that incorporated a cylinder with a braking device have been available on the market. However, after braking, the braking device must be released to again move the cylinder. The release operation required mechanical input from a second motor means, making the braking mechanism expensive and impractical for many applications.

The Multiposition Force Locking Cylinder will close and hold a payload regardless of the opposing force. The nature of the multiposition force locking cylinder is such that any increase in the opposing force results in an equal but opposite locking force. This remains true up until the structural failure of the physical parts of the cylinder. The Multiposition Force Locking Cylinder will remain locked regardless of the reason for failure (external to the locking mechanism). The Multiposition Force Locking Cylinder depends only on its own internal locking mechanisms. Fluid power failure will not cause the Multiposition Force Locking Cylinder to release.

The Multiposition Force Locking Cylinder is an important safety improvement. The simple, self locking principal now allows engineers and designers to offer safe pneumatic systems to their customers.

SUMMARY OF THE INVENTION

Most cylinder mechanisms have a direct physical contact between the piston means and the movable rod device, resulting in a direct input to output status. Since the primary function of the piston and rod in a conventional cylinder is to provide motion and exert force, locking must be achieved by the introduction of a second independents operating mechanism, typically a check valve or a rod locking clamp mechanism. Unfortunately, a check valve does not accurately and completely lock a pneumatic cylinder. Gaseous fluids are all compressible and obey the PV=NRT gas law. Additional forces will compress the fluid further resulting in motion of the piston and rod subassembly. A rod locking clamp mechanism is an effective way to lock the piston and rod subassembly. Unfortunately, these devices are expensive to build and often result in critical wear on the rod surface.

The invention disclosed overcomes many problems associated with the prior art by providing a force locking cylinder that achieves a true self-locking mode, independent of external media inputs. This unique mechanism is capable of locking at any position along the cylinder stroke path. The invention comprises generally one or more movable rod devices, a number of spherical or cylindrical locking devices, a release sleeve, a locking sleeve which is built into a piston subassembly, a lock rod, and structural members including a cylinder, end caps, seals and bearings. Therefore, the cylinder resembles a conventional fluid power cylinder.

This invention takes advantage of forces that are naturally generated during the operation of an air cylinder to lock and unlock the cylinder rod. At the same time, this invention utilizes these same forces to control the distance that the cylinder rod will move prior to locking. Opposing force, alone, is the primary method for controlling the distance that the cylinder rod will move. Opposing force is generated when an extending (or retracting) cylinder encounters an object that will not move. High mass, high velocity, acceleration, or static forces are each methods of the generating an opposing force. When an opposing force is encountered the cylinder rod stops its motion.

A truly unique relationship between the piston, moveable rod, and lock rod was invented to achieve the lock and release capability. The piston means and the cylinder rod subassembly are not rigidly attached in this invention. A small translational distance between the piston means and the cylinder rod subassembly allows the cylinder rod subassembly and adjacent components to move within the piston subassembly 143. This small translation results in additional control over two or more functions without the addition of a second degree of freedom. The piston means continues moving which results in the locking of the cylinder rod to the lock rod. A single piston and release subassembly 124 can achieve (1) movement, (2) locking and (3) unlocking of the cylinder rod 135.

Due to the unique, two phase operation of the piston means, it is possible to move the cylinder rod through a random distance against the payload object. The distance is generally controlled by the force generated against a payload object.

DEFINITION OF FREQUENTLY USED TERMS

Close-to-Lock—Moving a cylinder rod to a retracted position where the rod is locked rigidly in place.
End Effector—A functional devise designed to achieve a task while attached to a motion mechanism.
Force Track Means—A device capable of exerting forces over a displacement distance. Specific examples are a ball bearing, a thrust bearing, a linear guide, and a roller guide.
Gripper—A mechanism designed to exert force and hold a payload object.

Locking—The task when a cylinder encounters a resisting force that substantially stops motion of the rod and activates a mechanism.

Motor Means—A motion output devise capable of converting energy inputs into linear or rotary motion of a specific mass.

Open-to-Lock—Moving a cylinders rod to an extended position where ft is locked rigidly in place.

Payload Force—The force exerted on an cylinder by a payload object due to weight, size, mass, or acceleration.

Payload Object—The workpiece or target object.

Random Distance—A translation that can vary from one operating cycle to the next operating cycle.

Releasing—The task when a cylinder terminates all forces against a payload object.

Self-Locking—A mechanism will close (open) and hold the payload object regardless of the force and regardless of the reason for failure (external to the mechanism).

Extend—the motion of the cylinder rod out away from the cylinder body.

Retract—the motion of the cylinder or rod into the cylinder body.

Cylinder—a pneumatic devise comprised of a piston, rod, and caps and a sleeve, along with numerous seals and bearings.

Rod (or cylinder rod)—a mechanical devise designed to transmit linear forces from a fluid power device to a payload object.

End caps—A mechanical devise designed to contain the sleeve on an air cylinder. Two end caps are used with a sleeve to define the cylinder operating space. One end cap has a central space to accommodate the cylinder rod.

DESCRIPTION OF THE DRAWINGS

FIG. 1 is an isometric view of the self-locking cylinder;

FIG. 5 shows cross sectional end views of the close-to-lock mechanism;

FIG. 16 is a detailed cross sectional view of the extend-to-lock mechanism with a preset locking force;

FIG. 17 is a detailed cross sectional view of the retract-to-lock mechanism with a preset locking force;

DETAILED DESCRIPTION OF ILLUSTRATIVE EMBODIMENTS

First Embodiment—Extend-to-Lock

The term "Extend-to-Lock" refers to a mechanical operation wherein a self-locking cylinder 118 extends a movable rod 140 until it contacts an opposing force, mass, etc. The opposing force, Fo, interrupts motion of the movable rod 140 and activates the locking process. The cylinder 118 will then remain locked, developing an internal force sufficient to negate any magnitude of opposing force. Unlocking the cylinder 118 requires a retracting pressure to be introduced on a piston subassembly 149.

Referring to FIG. 1, a first embodiment of the self-locking cylinder 118 is shown.

Figure 2:
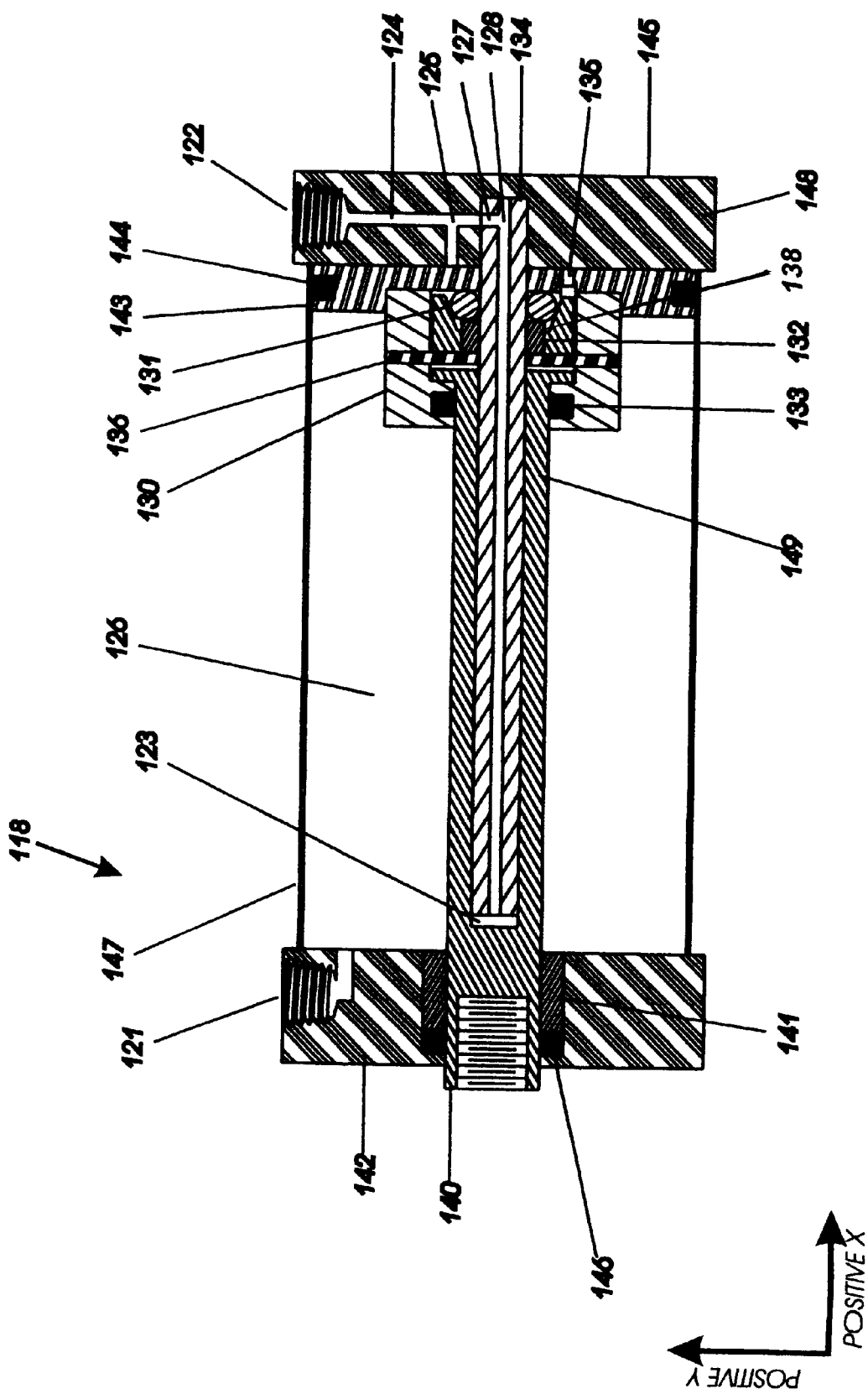
FIG. 2 is a cross sectional view of the lock and release mechanism, open-to-lock.

FIG. 2 shows a detailed view of the self-locking cylinder 118. Externally, the self-locking cylinder 118 resembles a conventional fluid power cylinder. The self-locking cylinder 118 is generally composed of a cylinder body assembly 148, a moveable rod 140, a release sleeve 132, a plurality of balls 131 and a piston subassembly 149. The cylinder body assembly 148 is generally composed of a lock rod 134, an end cap 145, a sleeve 147, a rod end cap 142, a rod seal 146 and a rod bearing 141. The piston subassembly 149 is generally composed of a piston 143, a piston seal 144, a piston extension 130, a seal 133, a plurality of release pins 136 and a plurality of non-lock pins 135.

The moveable rod 140 functions as the primary power output part for the cylinder. The moveable rod 140 is moved by the piston 143 and the piston extension 130, but is not directly attached to either of said parts. The moveable rod 140 slides within a space formed by the piston 143 and the piston extension 130 but is restricted by surfaces on the piston 143 and the piston extension 130. The moveable rod 140 contains a plurality of slots 190 which are penetrated by the release pins 136. The slots 190 are large enough to allow the moveable rod 140 to translate the maximum distance as provided by the piston 143 and the piston extension 130. The moveable rod has a conical surface 138 which contributes to the locking cycle.

The release sleeve 132 slides easily within the moveable rod 140 and upon the lock rod 134. The release sleeve 132 extends through the center of a conical ring 138 on the moveable rod and contacts a plurality of balls 131. The release sleeve 132 is functionally moved by a plurality of release pins 136 and/or the plurality of balls 131.

Figure 9:
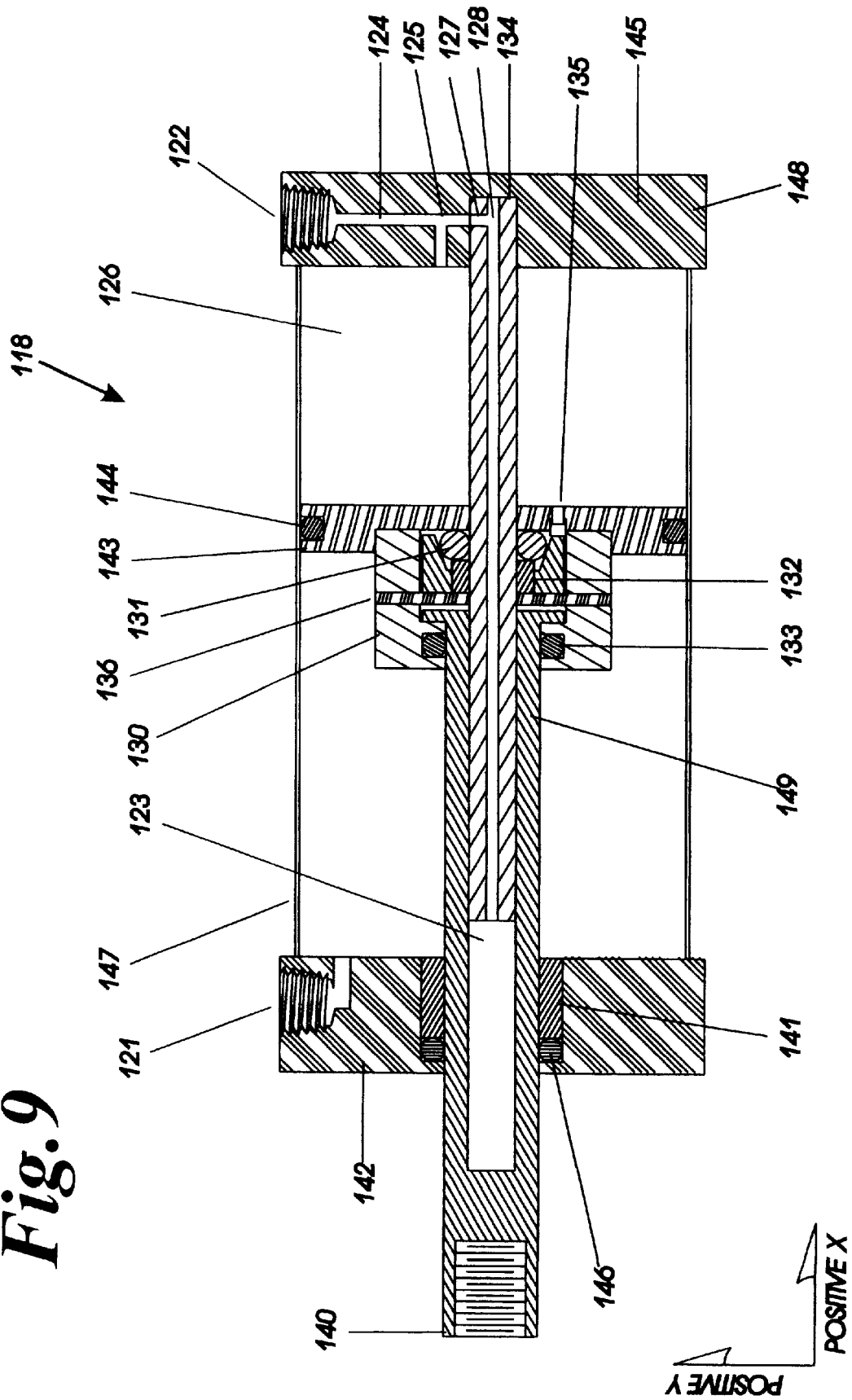
FIG. 9 is a detailed cross sectional view of the open-to-lock-release mechanism wherein the releasing mechanism has been engaged, self-locking has been terminated, and the cylinder rod is about to move away from the "opened and locked" position.
Figure 10:
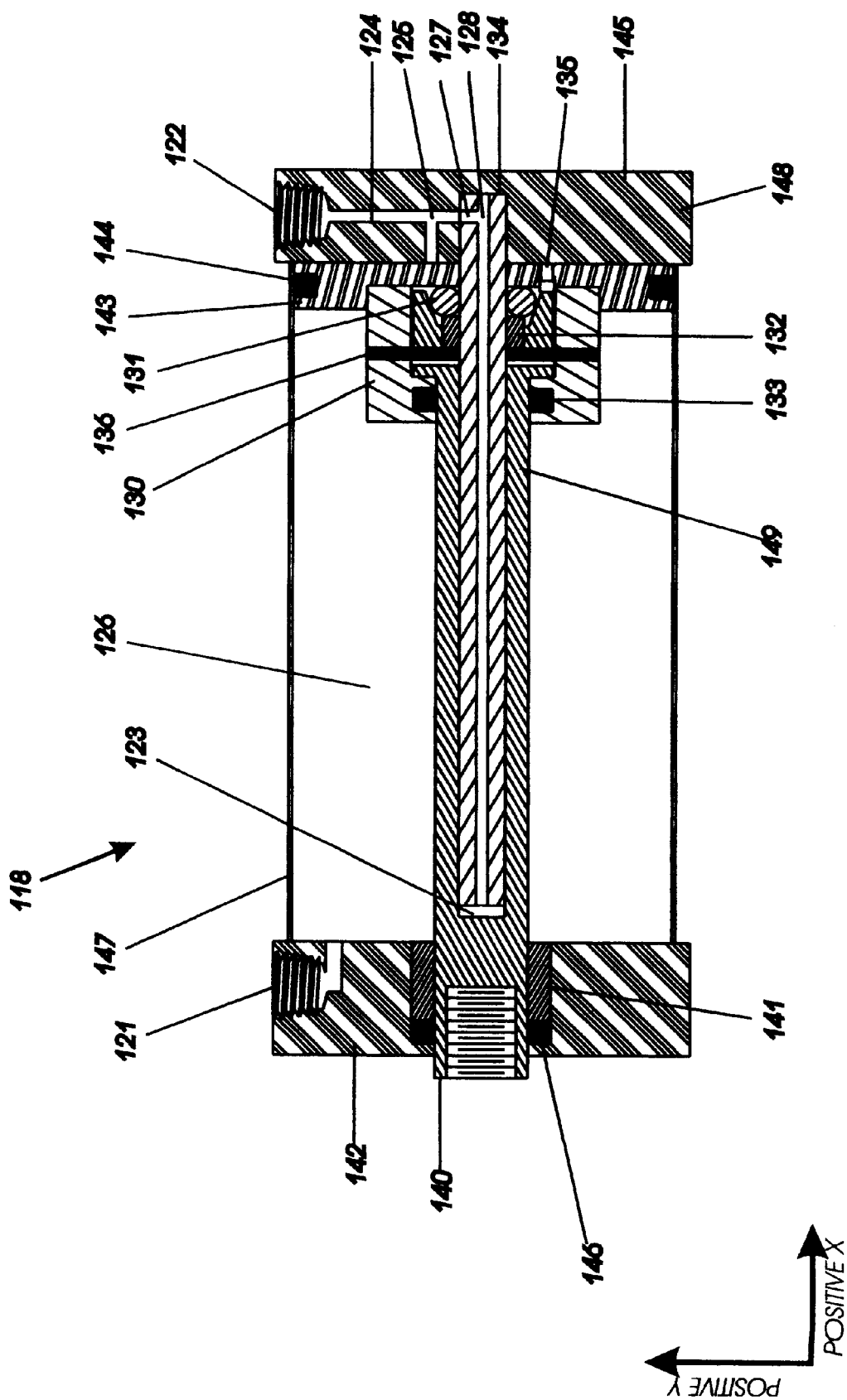
FIG. 10 is a detailed cross sectional view of the, open-to-lock-release mechanism wherein the cylinder rod is retracted and contacts the anti-lock mechanism.
Figure 11:
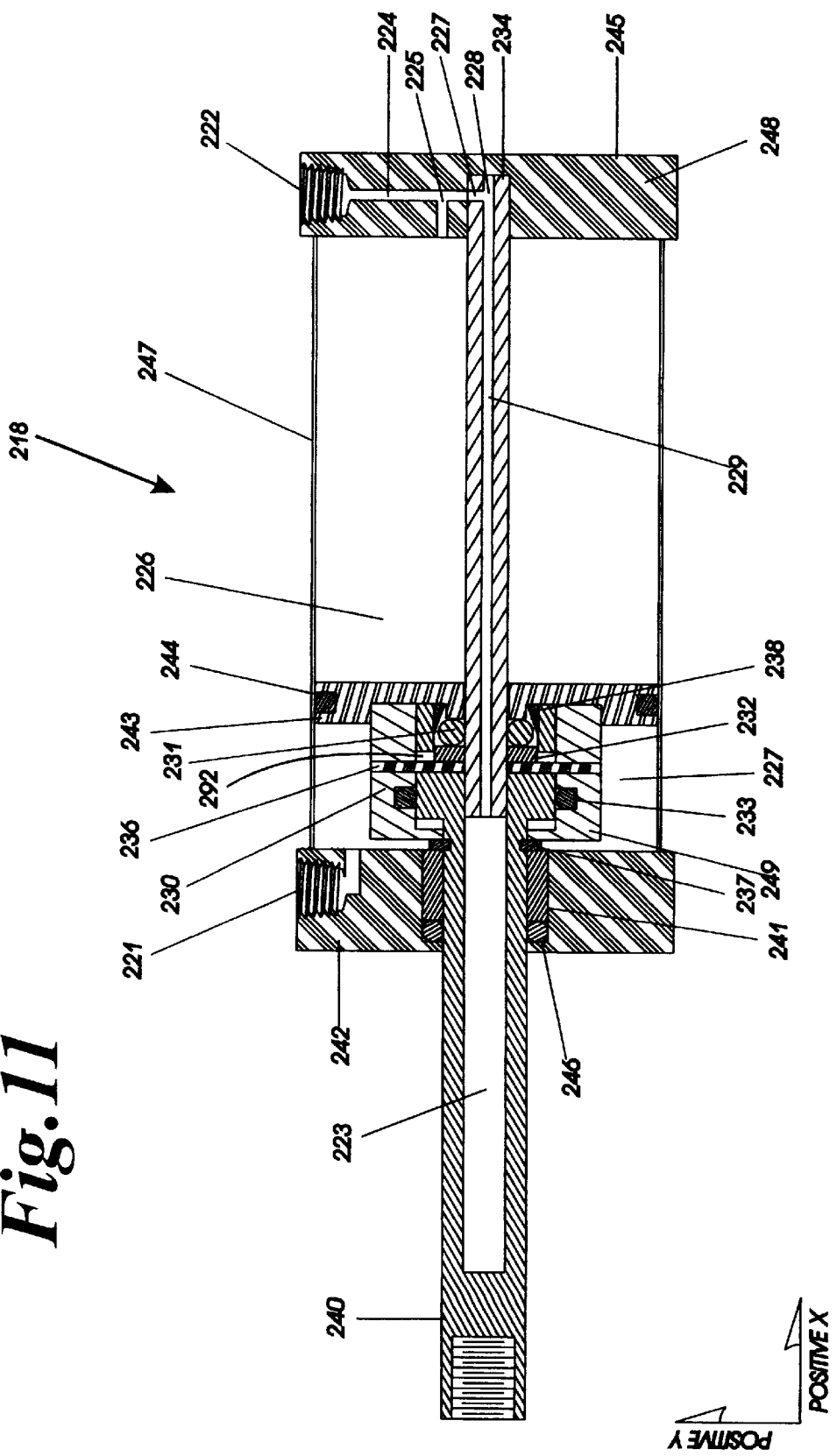
FIG. 11 is a detailed cross sectional view of the close-to-lock-release mechanism wherein the cylinder rod is extended.
Figure 12:
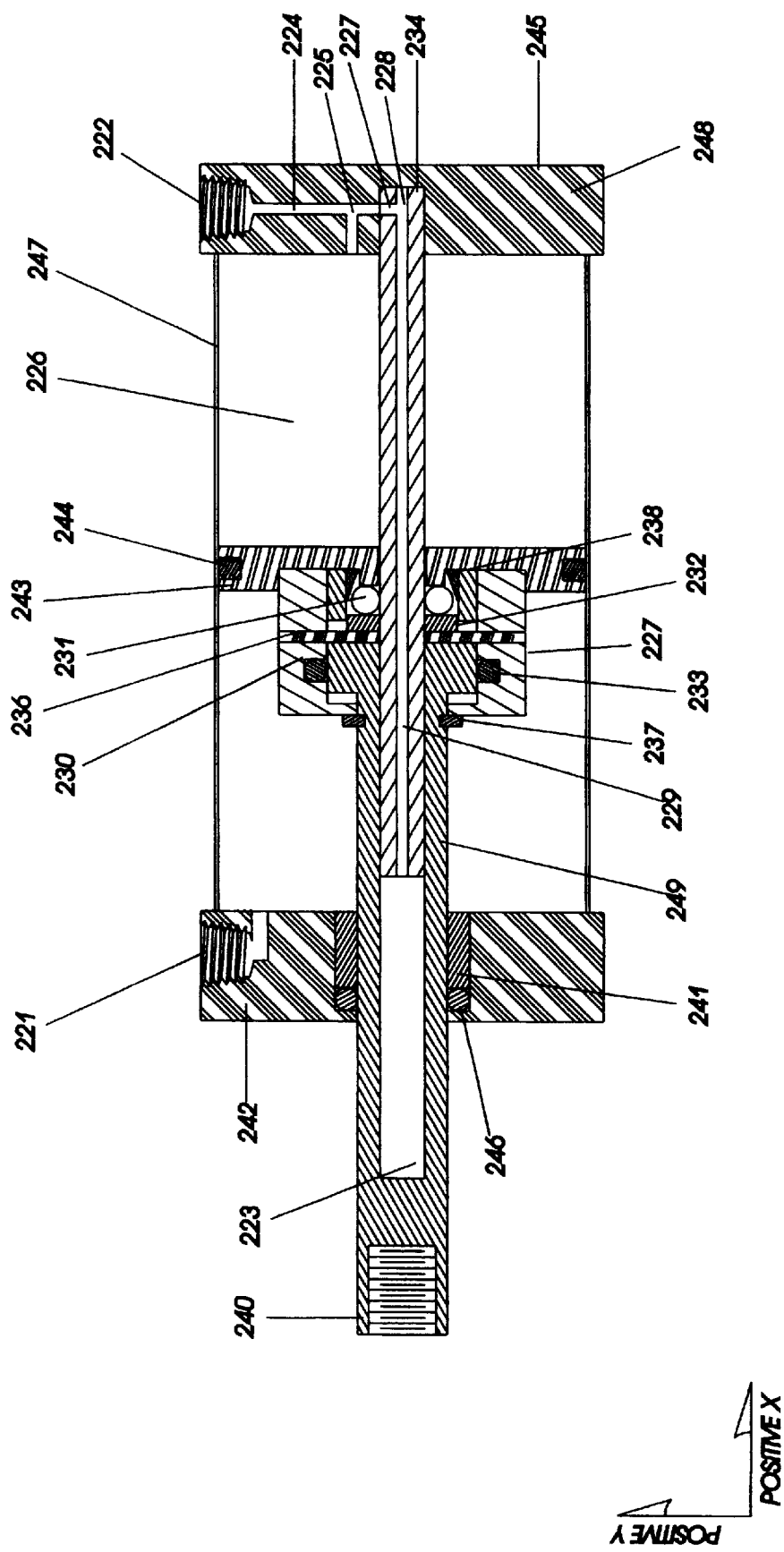
FIG. 12 is a detailed cross sectional view of the close-to-lock-release mechanism wherein the cylinder rod is partially retracted and the mechanism remains unlocked.

The plurality of balls 131 are contained within the conical ring 138 wherein they can be forced into a locking mode (FIG. 9) or a releasing mode (FIG. 10). The balls 131 are enclosed by surfaces on the release sleeve 132, the piston 143 and the conical surface 138.

The lock rod 134 is rigidly attached to the end cap 145. The end cap 145 contains air inlet/exhaust ducts 124 and 125 respectively. Inlet duct 124 attaches directly to the lock rod inlet 127. The lock rod also contains an axial duct 127.

The piston extension 130 is rigidly attached to the piston 143. The piston extension 130 and piston 143 form a chamber for the containment and operation of the moveable rod 140, release pins 136, release sleeve 132, the plurality of balls 131, the lock rod 134, and the non-lock pins 135.

The plurality of non-lock pins 135 are introduced to a space in the surface of the piston 143. These pins 135 move freely through a distance greater than or equal to the motion of the release pins 136. The non-lock pins 135 contact the surface of the endcap 145 substantially before the impact of the piston subassembly 149. Motion of the non-lock pins 135 stops while motion of the piston subassembly 149 continues. Continued motion of the piston subassembly 149 extends the non-lock pins 135 relative to the surface of the piston subassembly 149. The extended non-lock pins 135 contact the surface of the movable rod 140 and prevent it from wedging the balls 131 into a locked position against the lock rod 134.

There is no physical bonding nor is there an exact motion relationship between the piston subassembly 149 and the movable rod 140. A small translational distance allows the piston subassembly 149 and adjacent components to translate linearly over the movable rod 140. This small translation results in additional control over two or more functions without the addition of a second degree of freedom. Thus, in this invention, a single air cylinder and piston with movable rod subassembly can achieve (1) movement, (2) locking and (3) unlocking.

Second Embodiment—Retract-to-Lock

The term "Retract-to-Lock" refers to a mechanical operation wherein a self-locking cylinder 218 retracts the movable rod 240 until it contacts an opposing force, mass, etc. The opposing force, Fo, interrupts motion of a movable rod 240 and activates the locking process. See FIG. 13. The cylinder 218 will then remain locked, developing an internal force sufficient to negate any magnitude of opposing force. Unlocking the cylinder 218 requires a retracting pressure to be introduced on a piston subassembly 249.

Figure 4:
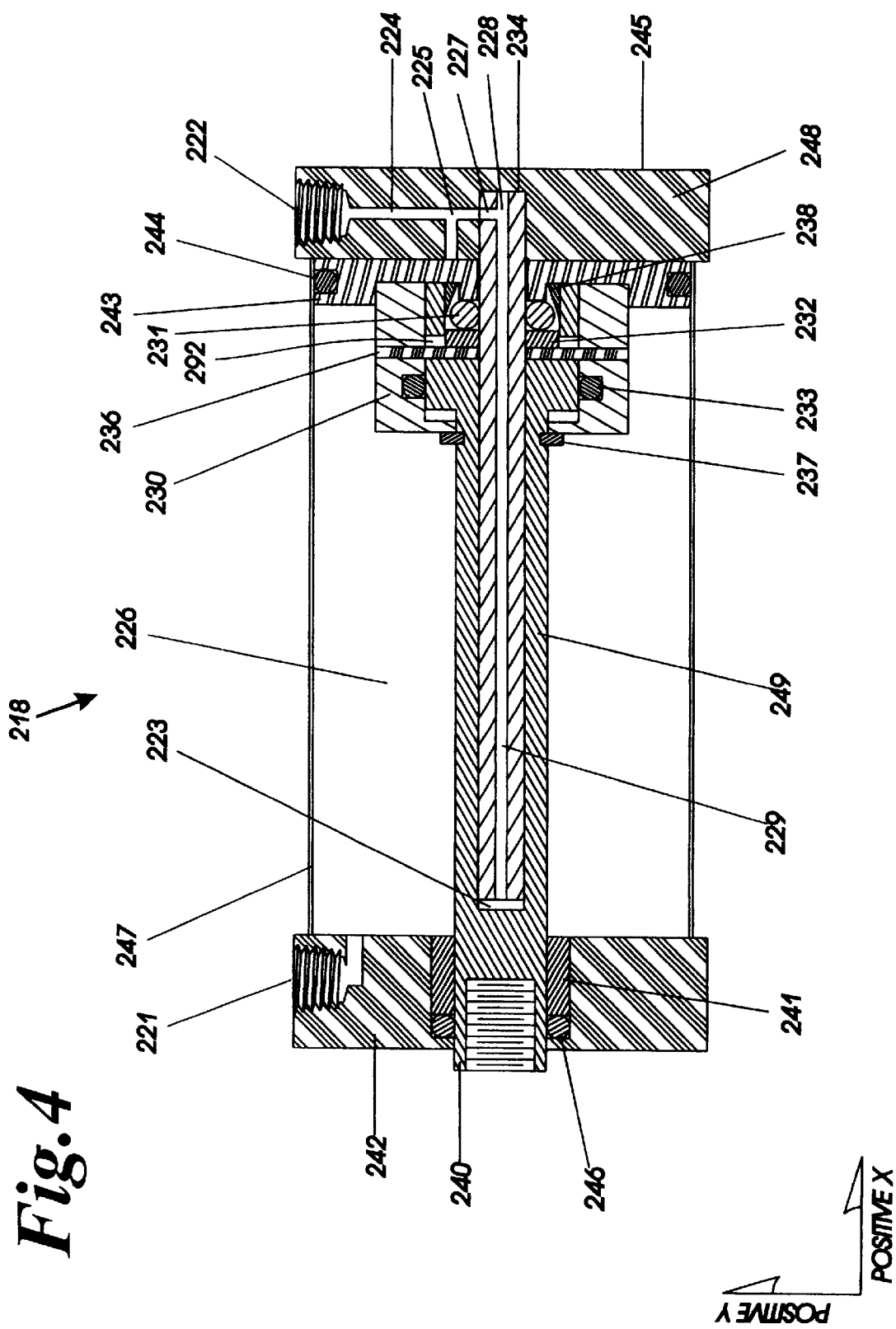
FIG. 4 is a cross sectional view of the lock and release mechanism, closed-to-lock.
Figure 6:
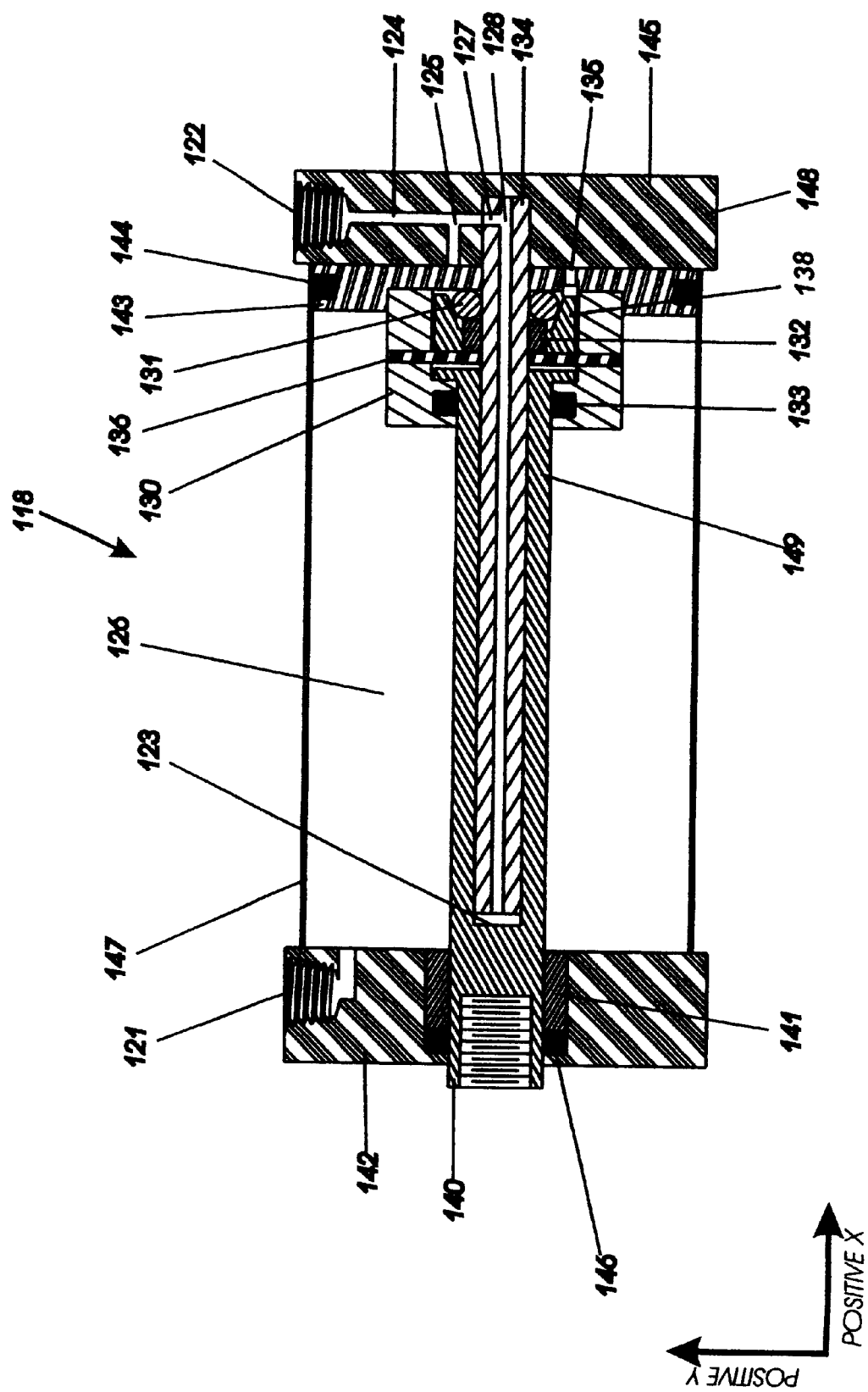
FIG. 6 is a detailed cross sectional view of the open-to-lock-release mechanism wherein the cylinder rod is retracted.

FIG. 4 shows a detailed view of the "Retract-to-Lock" self-locking cylinder 218. The self-locking mechanism for the Second Embodiment utilizes substantially identical parts to those described in the First Embodiment. The self-locking cylinder 218 is generally comprised of a cylinder body assembly 248, the moveable rod 240, a conical ring 238, a release sleeve 232, a plurality of balls 231 and the piston subassembly 249. The cylinder body assembly 248 is generally composed of a lock rod 234, an end cap 245, a sleeve 247, a rod end cap 242, a rod seal 246 and a rod bearing 241. The piston subassembly 249 is generally composed of a piston 243, a piston seal 244, a piston extension 230, a seal 233, a plurality of release pins 236 and a snap ring 237.

The moveable rod 240 functions as the primary power output part for the cylinder 218. The moveable rod 240 is moved by the piston 243 and the piston extension 230, but is not directly attached to either of said parts. The moveable rod 240 slides within a space formed by the piston 243 and the piston extension 230 but is restricted by surfaces on the piston 243 and the piston extension 230. The moveable rod 240 contains a plurality of slots 290 which are penetrated by the release pins 236. The slots 290 are large enough to allow the moveable rod 240 to translate the maximum distance as provided by the piston 243 and the piston extension 230. The moveable rod 240 is rigidly attached to a conical ring 238 which contributes to the locking cycle.

The release sleeve 232 slides easily within the moveable rod 240 and upon the lock rod 234. The release sleeve 232 extends through the center of the moveable rod 240 and contacts the plurality of balls 231. The release sleeve 232 is functionally moved by the plurality of release pins 236 and/or the balls 231.

Figure 13:
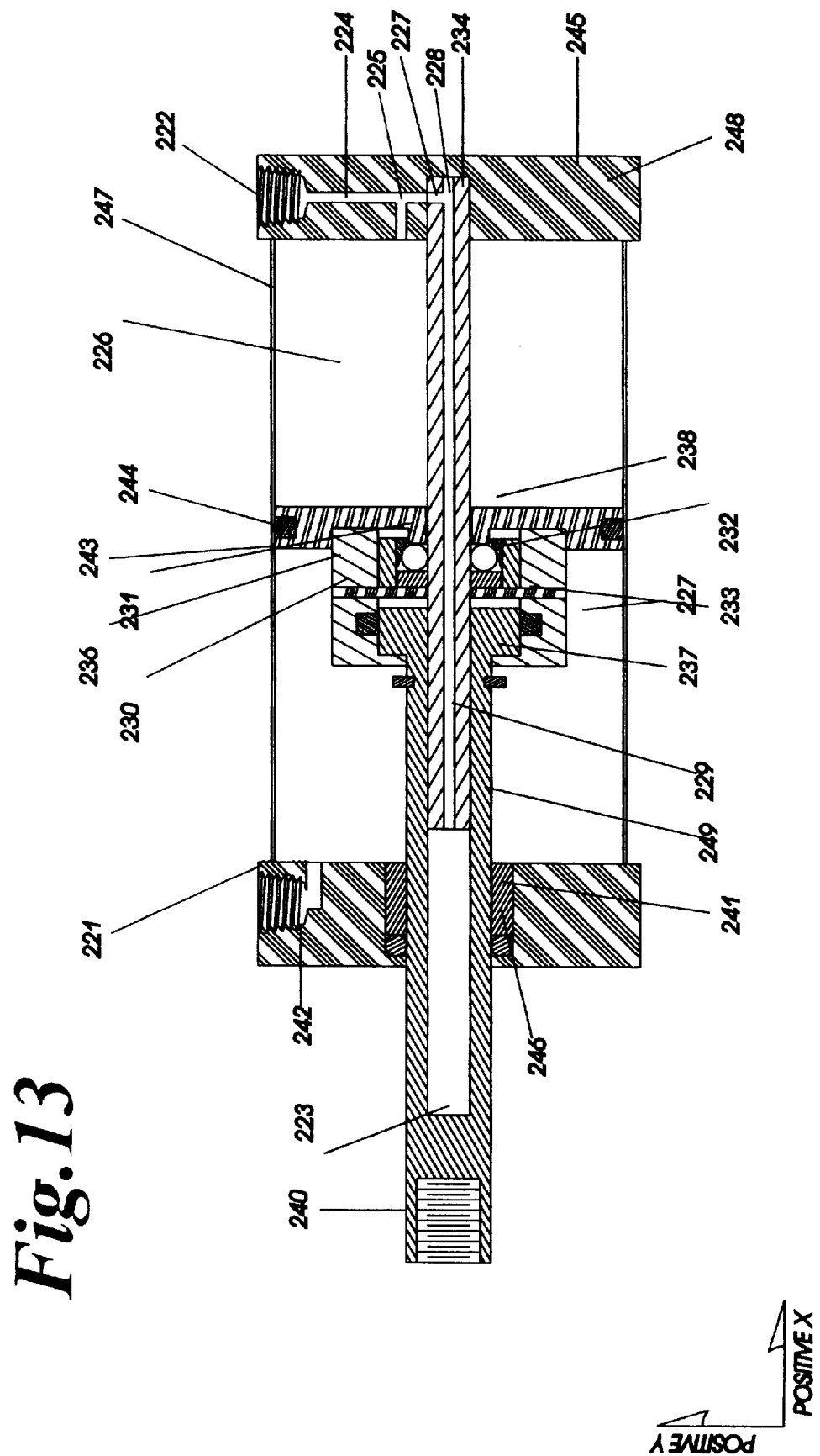
FIG. 13 is a cross sectional view of the close-to-lock-release mechanism wherein the cylinder rod has stopped motion and the lock mechanism has engaged.
Figure 14:
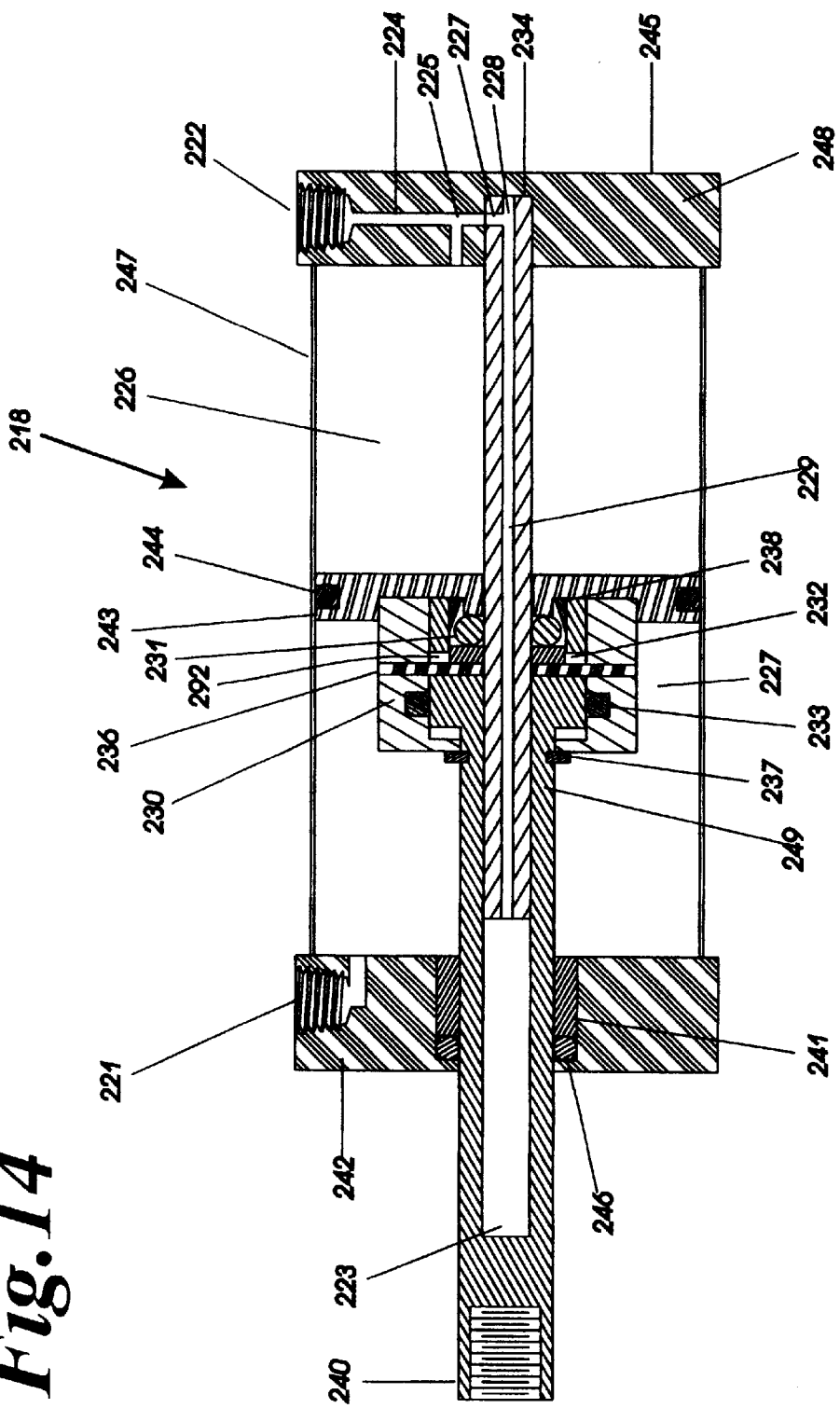
FIG. 14 is a detailed cross sectional view of the close-to-lock-release mechanism wherein the releasing mechanism has been engaged, self-locking has been terminated, and the cylinder rod is about to move away from the "closed and locked" position.
Figure 15:
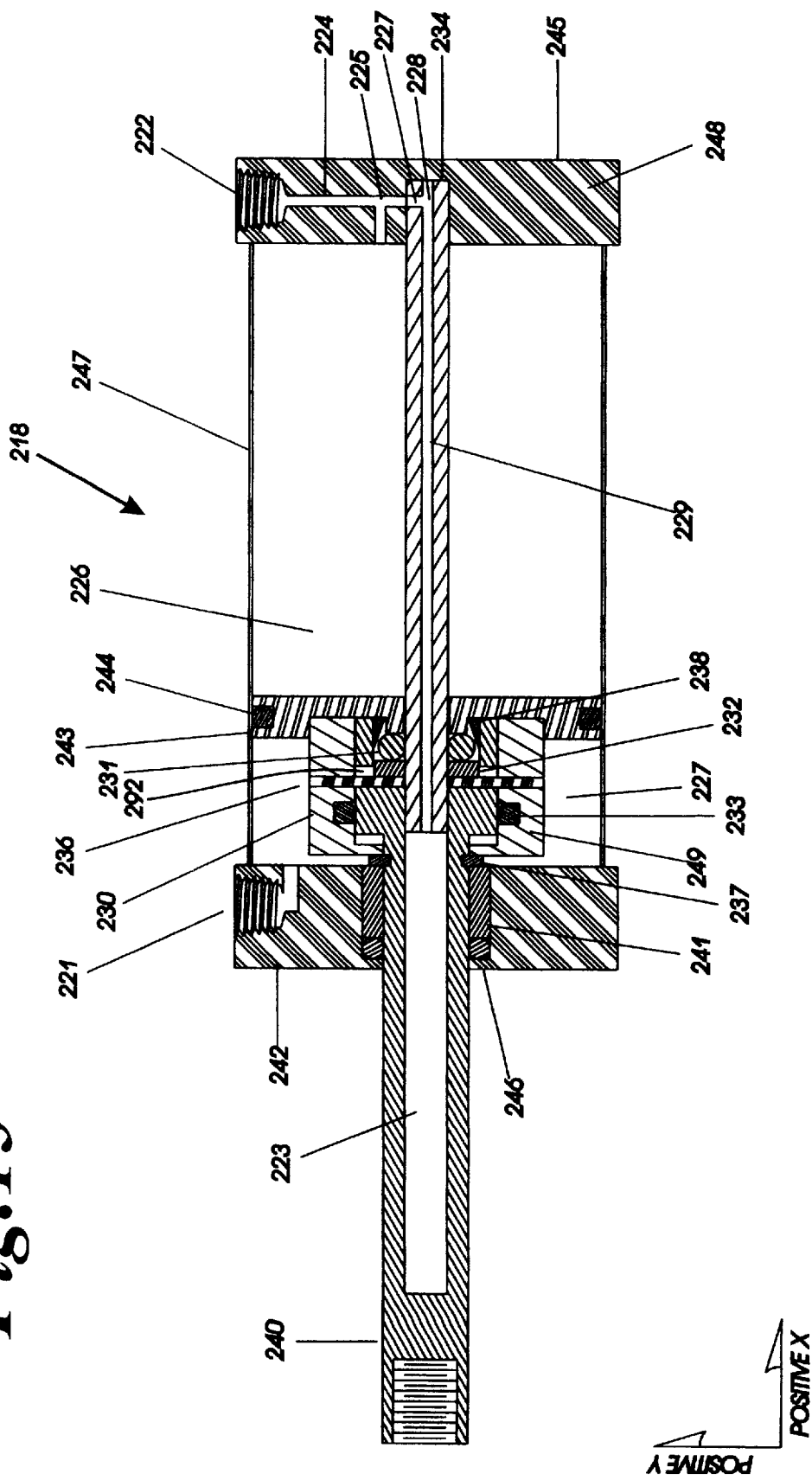
FIG. 15 is a detailed cross sectional view of the close-to-lock-release mechanism wherein the cylinder rod is extended and contacts the anti-lock mechanism.

The plurality of balls 231 are contained within the conical ring 238 wherein they can be forced into a locking mode (FIG. 13) or a releasing mode (FIG. 14). The balls 231 are enclosed by surfaces on the release sleeve 232, the piston 243 and the conical ring 238.

The lock rod 234 is rigidly attached to the end cap 245. The end cap 245 contains air inlet/exhaust ducts 224 and 225 respectively. Inlet duct 224 attaches directly to the lock rod inlet 227. The lock rod also contains an axial duct 227.

The piston extension 230 is rigidly attached to the piston 243. The piston extension 230 and piston 243 form a chamber for the containment and operation of the moveable rod 240, conical ring 238, release pins 236, release sleeve 232, the plurality of balls 231 and the lock rod 234.

A snap ring 237 is attached to the moveable rod 240. The snap ring 237 is displaced from the surface S of the piston extension 230 by a distance greater than or equal to the motion of the release pins 236. The snap ring 237 makes contact with the surface of the endcap 242 substantially before the impact of the piston subassembly 249. Motion of the snap ring 237, moveable rod 240 and conical ring 238 stops while motion of the piston subassembly 249 continues. Continued motion of the piston subassembly 249 extends the piston shoulder 293 into the connical ring 238. The extended piston shoulder 293 contacts the balls 231 and prevents them from wedging into a locked position against the lock rod 234.

In this invention, there is no physical bonding nor is there a distinct motion relationship between the piston subassembly 249 and the movable rod device 240. A small relief distance allows the piston subassembly 249 and adjacent components to translate linearly over and within the movable rod 240. This small translation results in additional control over two or more functions without the addition of a second degree of freedom. Thus, a single air cylinder and piston with movable rod subassembly can achieve (1) movement, (2) locking and (3) unlocking.

Third Embodiment—Spring Enhanced Extend-to-Lock

FIGS. 16-A and 16-B show detailed views of the Spring Enhanced version of the Extend-to-Lock cylinder. This third embodiment of the invention is identical to the first embodiment except that it has an additional part, spring 395. The spring 395 is located in a slot 394 formed by the piston 343 and piston extension 330. The spring 395 is compressed within slot 394 by the moveable rod 340. The spring 395 is a bistable element and upon seeing sufficient compression force, will snap from the extended form (FIG. 16-A) to a flattened form (FIG. 16-B). Release of the compression force will allow the spring 395 to return (FIG. 16-A).

There remains no physical bonding nor is there an exact motion relationship between the piston subassembly 349 and the movable rod 340 in this embodiment. A single air cylinder and piston with movable rod subassembly can achieve (1) movement, (2) locking and (3) unlocking. However, the moveable rod 340 which slides within a space formed by the piston 343 and the piston extension 330, is now restricted by the force produced by the spring 395.

Fourth Embodiment—Spring Enhanced Related-to-Lock

FIGS. 17-A and 17-B show detailed views of the Spring Enhanced version of the Retract-to-Lock cylinder. This fourth embodiment of the invention is identical to the second embodiment except that it has an additional part, spring 495. The spring 495 is located in a slot 494 formed by the moveable rod 440 and piston extension 430. The spring 495 is compressed within slot 494 by the moveable rod 440. The spring 495 is a bistable element and upon seeing sufficient compression force, will snap from the extended form (FIG. 17-A) to a flattened form (FIG. 17-B ). Release of the compression force will allow the spring 495 to return (FIG. 17-A).

There remains no physical bonding nor is there an exact motion relationship between the piston subassembly 449 and the movable rod 440 in this embodiment. A single air cylinder and piston with movable rod subassembly can achieve (1) movement, (2) locking and (3) unlocking. However, the moveable rod 440 which slides within a space formed by the piston 443 and the piston extension 430, is now restricted by the force produced by the spring 495.

OPERATION OF THE INVENTION EMBODIMENTS

Operation of the First Embodiment

The self-locking cylinder 118 is a motor assembly. It contains a number of mechanisms intended for the application of force during motion. The self locking cylinder operates when a fluid media is introduced through ports 121 or 122. The self-locking cylinder moves a basic part, called the piston assembly 143, laterally along an axial path to produce linear motion. The operation of the self locking cylinder 118 resembles the operation of a conventional fluid cylinder.

One ability of the multiposition self-locking cylinder 118 is to close a random distance and automatically lock in that discrete position. The mechanisms piston subassembly 149 contains one or more piston locking and releasing means that execute this task. A further ability of the self-locking cylinder is to maintain the self-locked position even under increased loading. A further ability of the self-locking cylinder 118 is to maintain the self-locked position even if the primary fluid pressure were to drop or fail all together. A further ability of the self-locking cylinder 118 is to release the lock mode and return to an open position without the addition of a second motor means or a second control means.

Jaw Locking and Release Mechanism

Figure 3:
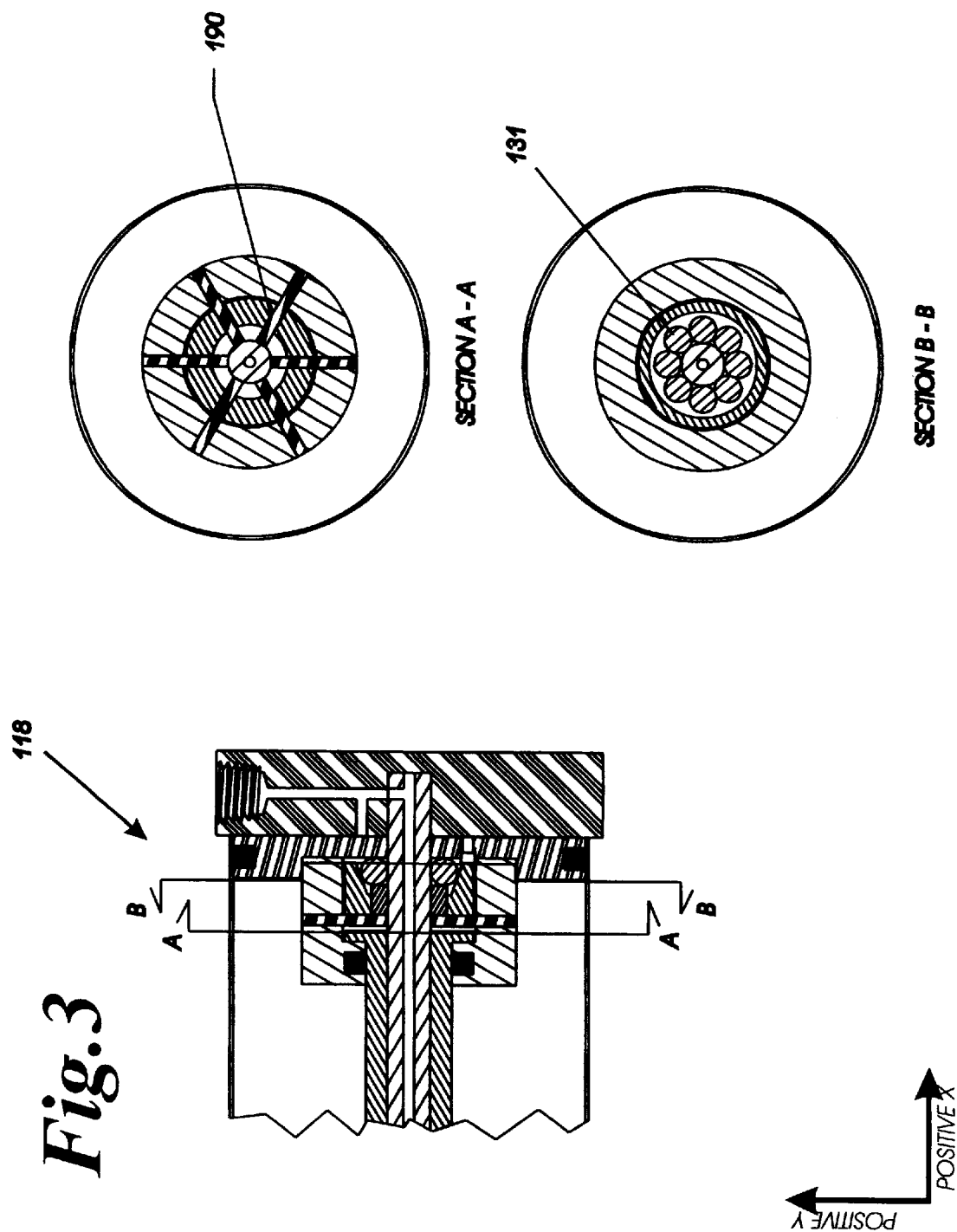
FIG. 3 shows cross sectional end views of the open-to-lock mechanism.

FIG. 4 shows a detailed view of the self-locking cylinder. The piston subassembly 149 contains the release sleeve 132. The release sleeve 132 slides easily within the movable rod 140 and extends through the center of the conical surface 138 on the movable rod 140. The plurality of balls 131 are contained within the conical surface 138 where they can be contacted by the release sleeve 132 when it pressed substantially against the release pins 136 as shown in FIG. 3. The balls 131 are held in a space defined by the release sleeve 132, the conical surface 138 on the movable rod 140 and the piston surface 143. The size and shape of this space changes when the release pins 136 (and release sleeve 132) move relative to the position of the movable rod 140.

Figure 8:
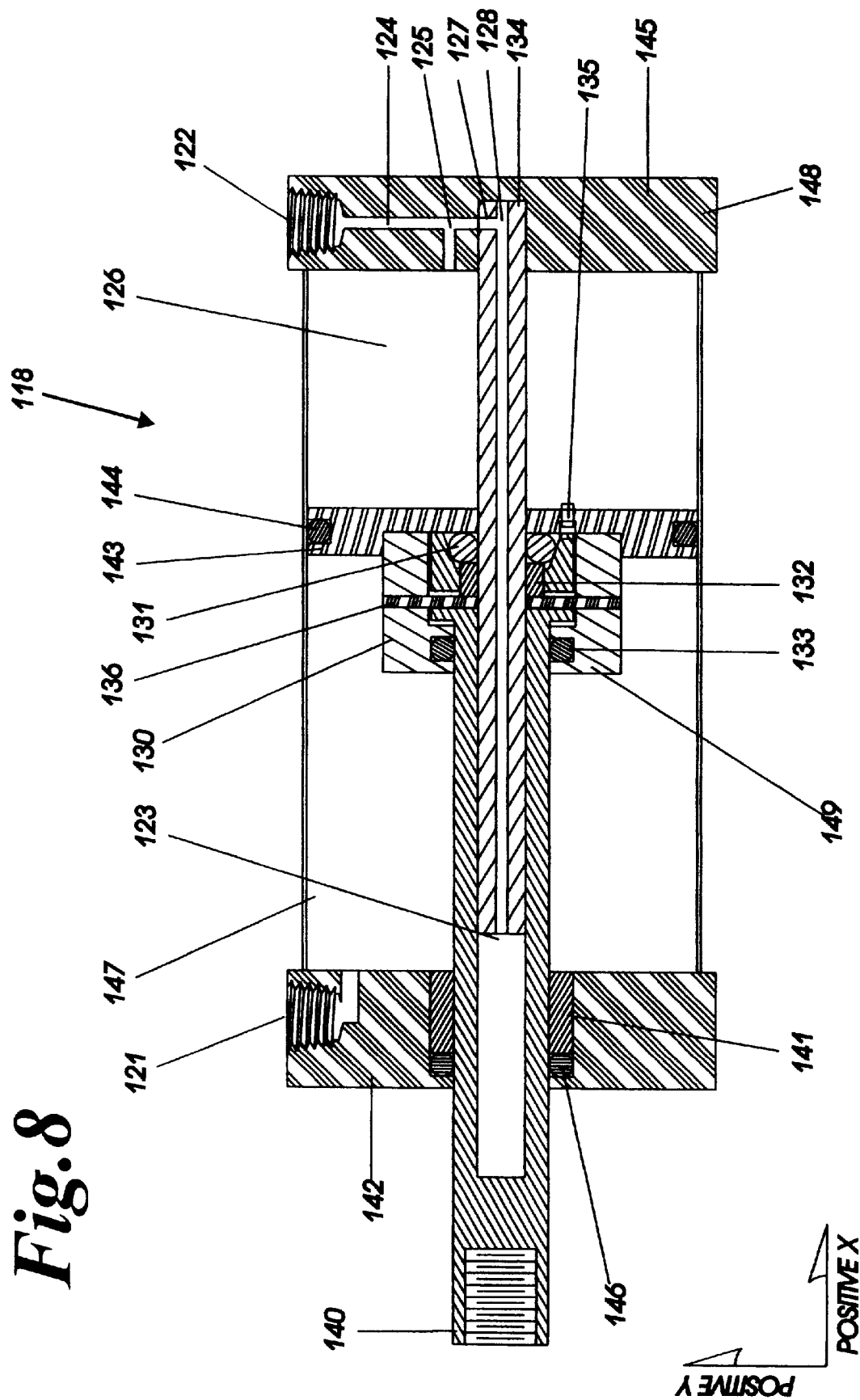
FIG. 8 is a cross sectional view of the open-to-lock release mechanism wherein the cylinder rod has stopped and the lock mechanism has engaged.

Rod extension occurs when fluid pressure is introduced through port 122 and fluid pressure is relieved at port 121. Locking occurs when extending motion of the movable rod 140 stops relative to motion of the piston subassembly 149. At this time, the operating pins 136 move, in the extended direction, in the slots 190 in the movable rod 140 allowing the release sleeve 132 to move in the extended direction. As shown in FIG. 8, the piston surface 143 presses the balls 131 in the extended direction and wedges them between the conical surface 138 of the movable rod 140 and the lock rod 134. Motion of the piston subassembly 149 stops when forces are balanced. The movable rod 140 is now locked against the lock rod 134. However, the piston 143 is not locked against either the movable rod 140 or the lock rod 134.

Release occurs when fluid pressure is introduced through port 121 (FIG. 9) and fluid pressure is relieved at port 122. The piston subassembly 149 is forced in a retracted direction, whereby the operating pins 136 engage the release sleeve 132 and force the release sleeve 132 in a retracted direction. The release sleeve 132 contacts the plurality of balls 131 and changes the force balance on the balls 131 such that they are removed from the self lock condition between the movable rod 140 and the lock rod 134. Force is now transferred directly to the movable rod 140 at surface and the movable rod 140 is forced in a retracted direction.

The piston subassembly 149 continues motion in the retracted direction, now pulling the movable rod 140. Full retraction of the piston subassembly 149 and the movable rod 140 would result in self locking of the movable rod 140 against the stationary piston subassembly 149. To prevent this event, several non-lock pins 135 are introduced in the space between the movable rod 140 and piston surface 143. These pins 135 move freely through a distance greater than or equal to the motion of the operating pins 136 in the slot 190. The non-lock pins 135 contact the surface of the endcap 145 substantially before the impact of the piston subassembly 149. Motion of the non-lock pins 135 stops while motion of the piston subassembly 149 continues. Continued motion of the piston subassembly 149 extends the non-lock pins 135 relative to the surface of the piston subassembly 149. The extended non-lock pins 135 contact the surface of the movable rod 140 and prevent it from wedging the balls 131 into a locked position against the lock rod 134. The self locking cylinder 118 is now in a fully retracted position and ready to extend.

Dynamic Analysis of the Operation of the Release Mechanism

When the self-locking cylinder 118 extends, very little force is exerted between the balls 131 and conical ring 138. The moveable rod 140 effectively becomes a piston 143 with seal 133 subject to the pressure of the fluid introduced at high pressure through port 122. The moveable rod 140 therefore wants to extend relative to the piston subassembly 149, removing all locking forces from the balls 131. Resistance forces at the seal 146 and bearing 141 are negligible.

Figure 7:
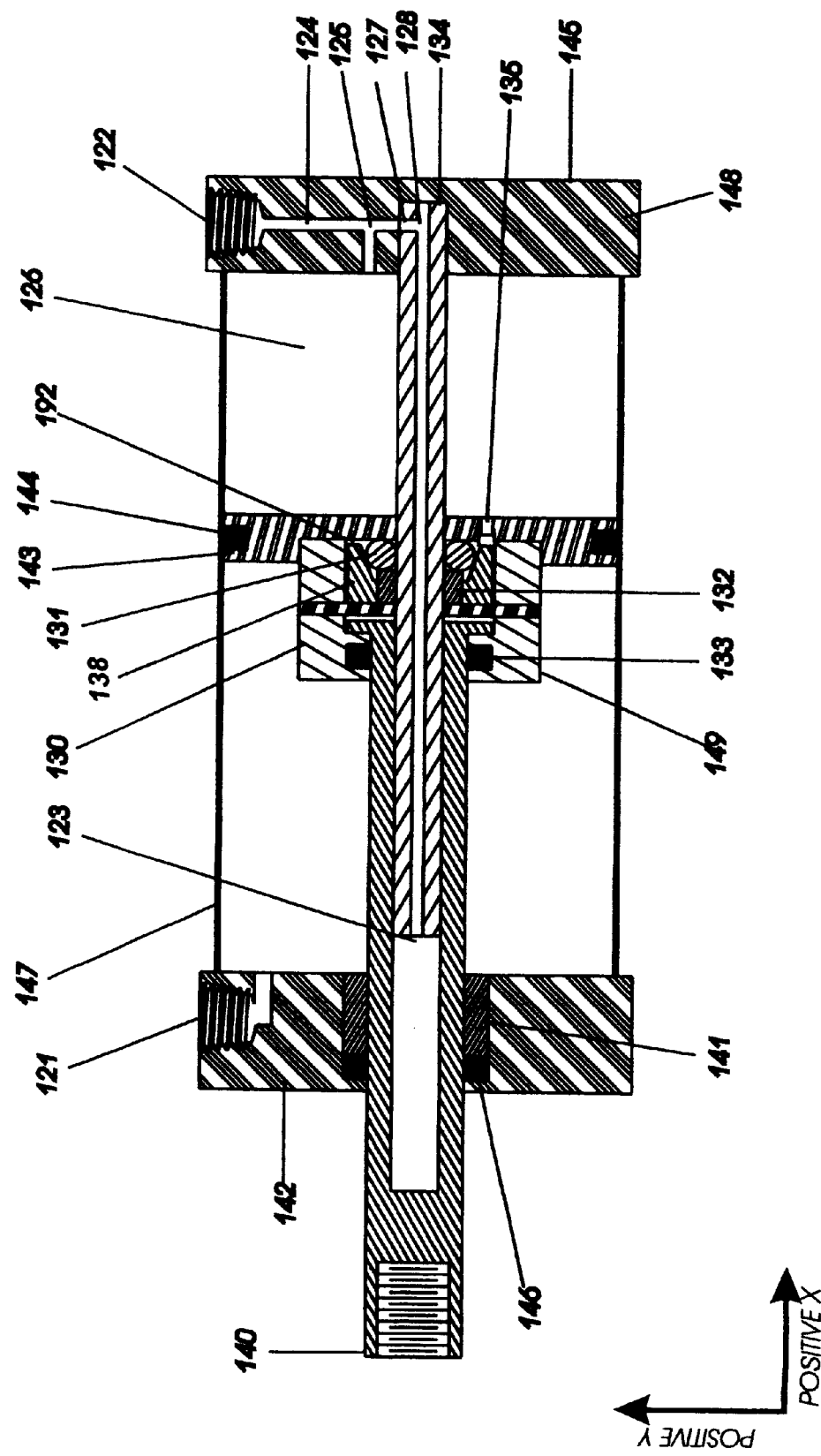
FIG. 7 is a detailed cross sectional view of the open-to-lock-release mechanism wherein the cylinder rod is partially extended and the mechanism remains unlocked.

As the piston subassembly 149 extends the movable rod 140, the inertia of the mass of the release sleeve 132, combined with the friction forces between the release sleeve 132 and the lock rod 134, force said release sleeve 132 against the balls 131. The balls 131 are trapped in a space between the release sleeve 132 and the piston surface 143 and said balls 131 are not able to physically contact the conical surface 138 of the movable rod 140 and the lock rod 134 simultaneously. The self-locking cylinder 118 continues this motion until a force is exerted upon the movable rod 140. Normally, this force would be the physical contact of the movable rod 140 and a payload object. At this instant, the piston subassembly 149 continues to drive towards a further extended position but the movable rod 140 stops translation due to the forces encountered. Reference is made to FIG. 7.

The piston subassembly 149 continues motion toward the extended direction due to pressure in the cylinder space 126. The release pins 136 move in the extended direction, relative to the movable rod 140. The force exerted by the release pins 136 against the release sleeve 132, drops to a low value and the release sleeve 132 moves in the extended direction, relative to the movable rod. The space that entraps the balls 131 grows, allowing the balls 131 to contact the conical surface 138 of the movable rod 140 and in the lock rod 134. Continued extended motion of the piston subassembly 149 forces the piston surface 143 against a the balls 131.

However, neither the movable rod 140 nor the lock rod 134 can move at this instant.

Locking occurs automatically when the piston surface 143 presses the balls 131 in the extended direction and wedges them between the conical surface 138 of the movable rod 140 and the lock rod 134. Motion of the piston subassembly 149 stops when forces are balanced. The movable rod 140 is now locked against the lock rod 134. However, the piston 143 is not locked against either the movable rod 140 or the lock rod 134.

The mechanical advantage of the conical surface 138 yields the equation for force;

$$Fp = Fr \sin A$$

where A is the angle between the conical surface 138 and the lock rod 134. Therefore, an extremely large force Fr can be generated by designing a system with a low value A even with a low Fp. Summing the moments about the center of the ball; and since r is a constant and u is equal for equivalent materials, $$Fr = Fp - Fn$$

Once the balls 131 are held firmly in place between the lock rod 134 and the conical surface 138 of the movable rod 140, the position of the movable rod 140 is locked relative to the position of the lock rod 134. The piston force Fp can now be removed and the forces will balance.

$$Fn = Fr \cos A + uFn \sin A$$

$$Fr \sin A = uFr \cos A + uFn$$

Increased force from the payload object (Fr Sin A) will result in increased force between the lock rod 134, balls 131 and movable rod 140 resulting in a statically balanced condition. The movable rod 140 cannot translate in the retracted direction, regardless of the magnitude of the force exerted on the movable rod 140 by the payload object.

The only functional way to release the self-locking cylinder 118 is to remove the balls 131 from the entrapped position between the conical surface 138 and the lock rod 134. This is accomplished when the piston means 143 moves the release sleeve 132 in the retracted direction. Further motion of the release sleeve 123 increases the negative force Fs on the balls 131 until they move in the retracted direction.

$$Fs + Fr \sin A = uFr \cos A + uFn$$

At this instant, self-locking is terminated and the movable rod 140 begins to retract. The piston subassembly 149 continues to apply force against the movable rod 140. The balls 131 are constantly forced in the retracted direction ahead of and away from the conical surface 138 on the movable rod 140. Self-locking does not occur and the self-locking cylinder 118 moves freely to the retracted position.

Fluid Dynamics Analysis of the Operation of the Self-Locking Cylinder

Fluid is introduced in to the extending rod through port 122. There is an absence of pressure on the opposite side of the piston subassembly 149. Therefore, fluid flows freely and rapidly through channel 124 and passes intersection 125. Gaseous fluids obey the usual PV=NRT gas law. Control is maintained over the pressure, as the cylinder fills, by the size of the channels (124, 127, 128 respectively).

Fluid continues to flow through channel 128 and into the hollow center of the lock rod 134. The larger diameter channel 128 drops the resistance and encourages flow into the center of the lock rod 134. Fluid flows through the lock rod 134 and into the cavity 123 establishing a pressure between the movable rod 140 and in the lock rod 134.

As fluid flows past the intersection 125 at a high velocity, a capillary in effect is established at Intersection 125. This reduces the pressure in channel 127 slightly, relative to the pressure in intersection 125. However, fluid does flow through channel 127 and into the cylinder cavity 126. Fluid is introduced into space 126 but pressure is dynamically reduced until a static balance is achieved at the intersection 125.

The mechanical link between the piston 143 and the movable rod 140 keeps the flow and motion of both parts synchronized. The fluid dynamic state continues as the cylinder 118 extends and until such time as the movable rod 140 encounters an opposing force and stops extending motion. At that instant, the piston means 143 continues motion and self locking occurs. After self locking, the fluid achieves static balance.

Unlocking it is achieved by reducing the fluid pressure at port 122 and increasing the fluid pressure at port 121. The cylinder 118 then retracts and follows the patterns of a conventional fluid cylinder.

An additional seal 133 is necessary because of the slight motion of the piston means 143 relative to the movable rod 140.

Operation of the Second Embodiment

The self-locking cylinder 218 is a motor assembly. It contains a number of mechanisms intended for the application of force during motion. The self locking cylinder 218 operates when a fluid media is introduced through ports 221 or 222. The self-locking cylinder 218 moves a basic part, called the piston subassembly 249, laterally along an axial path to produce parallel motion. The operation of the self locking cylinder 218 resembles the operation of a conventional air cylinder.

One ability of the multiposition self-locking cylinder 218 is to close a random distance and automatically lock in that discrete position. The mechanisms piston subassembly 249 contains one or more piston locking and releasing means that execute this task. A further ability of the self-locking cylinder 218 is to maintain the self-locked position even under increased loading. A further ability of the self-locking cylinder 218 is to maintain the self-locked position even if the primary fluid pressure were to drop or fail all together. A further ability of the self-locking cylinder 218 is to release the lock mode and return to an open position without the addition of a second motor means or a second control means.

Jaw Locking and Release Mechanism

FIG. 5 shows a detailed view of the self-locking cylinder 218 with the Close-To-Lock embodiment. The piston subassembly 249 contains the lock rod 234. The lock rod 234 slides easily within the movable rod 240 and extends through the center of the conical ring 238. The plurality of balls 231 are contained within the conical ring 238 where they can be contacted by the locking sleeve 232 when it is pressed substantially against the release pins 236 as shown in FIG. 17. The balls 231 are held in a space defined by the locking sleeve 232, the conical ring 238 and the piston release surface 255. The size and shape of this space changes when the release pins 236 (and locking sleeve 232) move relative to the position of the movable rod 240.

Retraction occurs when fluid pressure is introduced through port 221 and fluid pressure is relieved at port 222. Locking occurs when retracting motion of the movable rod 240 stops relative to motion of the piston subassembly 249.

At this time, the release pins 236 move, in the retracted direction, in slots 251 in the movable rod 240 forcing the locking sleeve 232 to move in the retracted direction. As shown in FIG. 13, the locking sleeve 232 presses the balls 231 in the retracted direction and wedges them between the conical ring 238 and the lock rod 234. Motion of the piston subassembly 249 stops when forces are balanced. The movable rod 240 is now locked against the lock rod 234. However, the piston 243 is not locked against either the movable rod 240 or the lock rod 234.

Release occurs when fluid pressure is introduced through port 222 (FIG. 14) and fluid pressure is relieved at port 221. The piston subassembly 249 is forced in an extended direction, whereby the release pins 236 release the locking sleeve 232, and the piston subassembly 249 develops force in an extended direction. The piston release surface 196 contacts the plurality of balls 231 and changes the force balance on the balls 231 such that they are removed from the self-locked condition between the movable rod 240 and the lock rod 234. Force is now transferred directly to the movable rod 240 at surface 256 and the movable rod 240 is forced in an extended direction. The piston subassembly 249 continues motion in the extended direction, now pushing the movable rod 240.

The moveable rod 240 has a slot which contains a snap ring 237. The snap ring 237 stops extension of the moveable rod 240 prior to the fully extended position, thereby eliminating self-locking.

Dynamic Analysis of the Operation of the Release Mechanism

When the self-locking cylinder 218 retracts, very little force is exerted between the balls 231 and conical ring 238. The moveable rod 240 effectively becomes a piston with seal 233 subject to the pressure of the fluid introduced at high pressure through port 222. The moveable rod 240 therefore wants to retract relative to the piston subassembly 249, removing all locking forces from the balls 231. Resistance forces at the seal 246 and bearing 241 are negligable.

As the piston subassembly 249 retracts, the movable rod 240 follows the motion of the piston subassembly 249. If the piston 243 were to initiate a locking sequence, the piston subassembly 249 would cease motion. However, the pressure applied to the moveable rod 240, at seal 233, would continue retracting the moveable rod 240. This motion would free the balls 231 and the piston 243 would continue retracting. The balls 231 are trapped in a space between the locking sleeve 232 and the piston surface 243 and the balls 231 are no longer able to physically contact the conical ring 238 and the lock rod 234 simultaneously. The self-locking cylinder 218 continues this motion until a force is exerted upon the movable rod 240. Normally, this force would be the physical contact of the movable rod 240 and a payload object 259. At this instant the movable rod 240 stops translation due to the forces encountered but the piston subassembly 249 continues to drive towards a further retracted position. Reference is made to FIG. 16.

The piston subassembly 249 continues motion toward the retracted direction due to pressure in the cylinder space 226. The release pins 236 move in the retracted direction, relative to the movable rod 240. The release pin 236 force, against the locking sleeve 232, increases to a high value and the locking sleeve 232 moves in the retracted direction, relative to the movable rod 240. The space that entraps the balls 231 shifts, allowing the balls 231 to contact the conical ring 238 and the lock rod 234.

Continued retracting motion of the piston subassembly 249 forces the balls 231 and mechanically locks the moveable rod 240 to the lock rod 234. When forces are balanced all motion stops. The movable rod 240 is now locked against the lock rod 234. However, the piston 243 is not locked against either the movable rod 240 or the lock rod 234.

The mechanical advantage of the conical surface 238 yields the equation for force;

$$Fp = Fr \sin A$$

where A is the angle between the conical surface 238 and the lock rod 234. Therefore, an extremely large force Fr can be generated by designing a system with a low value A even with a low Fp. Summing the moments about the center of the ball; and since r is a constant and u is equal for equivalent materials, $$Fr = Fp - Fn$$

Once the balls 231 are held firmly in place between the lock rod 234 and the conical ring 238 of the movable rod 240, the position of the movable rod 240 is locked relative to the position of the lock rod 234. The piston force Fp can now be removed and the forces will balance.

$$Fn = Fr \cos A + uFn \sin A$$

$$Fr \sin A = uFr \cos A + uFn$$

Increased force from the payload object 259 (Fr Sin A will result in increased force between the lock rod 234, balls 231 and movable rod 240 resulting in a statically balanced condition. The movable rod 240 cannot translate in the extended direction, regardless of the magnitude of the force exerted on the movable rod 240 by the payload object 259.

The only functional way to release the self-locking cylinder 218 is to remove the balls 231 from the entrapped position between the conical ring 238 and the lock rod 234. This is accomplished when the piston means 243 moves in the retracted direction. Further motion of the piston means 243 increases the force Fs on the balls 231 until they move in the retracted direction.

$$Fs + Fr \sin A = uFr \cos A + uFn$$

At this instant self-locking is terminated and the movable rod 240 begins to retract. The piston subassembly 249 continues to apply force against the movable rod 240. The balls 231 are constantly forced in the extended direction ahead of and away from the conical ring 238 on the movable rod 240. Self-locking does not occur and the self-locking cylinder 218 moves freely to the extended position.

Fluid Dynamics Analysis of the Operation of the Self-Locking Cylinder

Fluid is introduced into the cylinder 218 through port 221 to achieve retracting and locking. The mechanical link between the piston means 243 and the movable rod 240 keeps the flow and motion of both parts synchronized. The fluid dynamic state continues as the cylinder retracts and until such time as the movable rod 240 encounters an opposing force and stops extending motion. At that instant, the piston means 243 continues motion and self locking occurs. After self locking, the fluid achieves static balance.

Unlocking it is achieved by reducing the fluid pressure at port 221 and increasing the fluid pressure at port 222. There is an absence of pressure on the opposite side of the piston subassembly 249. Therefore, fluid flows freely and rapidly through channel 224 and passes intersection 225. Gaseous fluids obey the usual PV=NRT gas law. Control is maintained over the pressure, as the cylinder extends, by fixing the size of the channels (224, 227, 228 respectively).

Fluid continues to flow through channel 228 and into the hollow center of the lock rod 234. A smaller diameter channel 228 increases the resistance and discourages flow into the center of the lock rod 234. This reduces the pressure in the lock rod 234 slightly, relative to the pressure in intersection 225. Fluid does flow through channel 229 and into the lock rod 234 but the pressure is dynamically reduced. The lower pressure in chamber 223 allows the piston assembly 249 to extend without locking.

An additional seal 233 is necessary because of the slight motion of the piston means 243 relative to the movable rod 240.

Operation of the Third Embodiment

FIGS. 16-A and 16-B show detailed views of the Spring Enhanced version of the Extend-to-Lock cylinder. This third embodiment of the invention is identical to the first embodiment except that it has an additional part, a spring 395. The spring 395 is located in a slot 394 formed by the piston 343 and piston extension 338. The spring 395 is compressed within slot 394 by the moveable rod 340. The spring 395 is a bistable element. Exerting a sufficient compression force, will snap it from the extended form (FIG. 16-A) to a flattened form (FIG. 16-B). Release of the compression force will allow the spring 395 to return ( FIG. 16 -A).

The piston subassembly 349 and the movable rod 340 are linked in a physical and motion relationship, however there is a small degree of freedom along the axial direction between these parts. A cylinder with piston and movable rod subassembly can achieve (1) movement, (2) locking and (3) unlocking. However the moveable rod 340, which slides within a space formed by the piston 343 and the piston extension 330, is now restricted by the force produced by the spring 395.

Dynamic Analysis of the Operation of the Release Mechanism

When the self-locking cylinder 318 extends, the moveable rod 340 effectively becomes a piston 343 with seal 333. As the piston subassembly 349 extends the movable rod 340, the spring 395 force, Fs, holds the moveable rod 340 out and away from the piston subassembly 349. Reference is made to FIG. 16-A. The moveable rod 340 therefore extends relative to the piston subassembly 349, removing all locking forces from the balls 331.

The spring force Fs provides a threshold force for the cylinder 318 as it moves. The moveable rod 340 therefore wants to extend relative to the piston subassembly 349, removing all locking forces from the balls 331. Any force from an object where Fo<Fs will result in continued motion of the cylinder 318. The balls 331 are trapped in a space between the release sleeve 332 and the piston surface 343. The balls 331 are not able to physically contact the conical surface 338 of the movable rod 340 and the lock rod 334 simultaneously. The self-locking cylinder continues this motion until a force Fo=Fs is exerted upon the movable rod 340.

When Fo=Fs the spring 395 inverts allowing the piston subassembly 349 to drive towards the movable rod 340. The moveable rod 340 stops translation due to the forces Fo encountered. Reference is made to FIG. 16-B. The piston subassembly 349 moves the release pins 336 in the extended direction, relative to the movable rod 340. The release sleeve 332 moves in the extended direction, relative to the movable rod. The space that entraps the balls 331 grows, allowing the balls 331 to contact the conical surface 338 of the movable rod 340 and the lock rod 334. Continued extended motion of the piston subassembly 349 forces the piston surface 343 rigidly against the balls 331.

Locking occurs automatically when the piston surface 343 presses the balls 331 in the extended direction and wedges them between the conical surface 338 of the movable rod 340 and the lock rod 334. Motion of the piston subassembly 349 stops when forces are balanced.

Increased force from the payload object 359 (Fr Sin A) will result in increased force between the lock rod 334, balls 331 and movable rod 340 resulting in a statically balanced condition. The movable rod 340 cannot translate in the retracted direction, regardless of the magnitude of the force exerted on the movable rod 340 by the payload object 359.

The release of the self-locking cylinder is accomplished when the piston means 343 moves the release sleeve 332 in the retracted direction. Reference is made to FIG. 16-B. Further motion of the release sleeve 332 increases the negative force Fs on the balls 331 until they move in the retracted direction.

$$Fs+Fr \sin A = uFr \cos A + uFn + F\text{spring}$$

At this instant self-locking is terminated and the movable rod 340 begins to retract.

Fluid Dynamics Analysis of the Operation of the Self-Locking Cylinder

Fluid flows through the lock rod 334 and into the chamber 323 establishing a pressure between the movable rod 340 and in the stationary lock rod 334. Fluid is introduced into space 326 but pressure is dynamically reduced until a static balance is achieved at the intersection 325. The mechanical link between the piston means 343 and the movable rod 340 keeps the fluid flow and motion of both parts synchronized. The fluid dynamic state continues until such time as the movable rod 340 encounters an opposing force and stops extending motion. At that instant, the piston means 343 continues motion and self locking occurs. After self locking, the fluid achieves static balance.

Unlocking is achieved by reducing the fluid pressure at port 322 and increasing the fluid pressure at port 321. The cylinder 318 then retracts and follows the patterns of a conventional fluid cylinder.

Operation of the Fourth Embodiment

FIGS. 17-A and 17-B show detailed views of the Spring Enhanced version of the Retract-to-Lock cylinder 418. This fourth embodiment of the invention is identical to the second embodiment except that it has an additional part, spring 495. The spring 495 is located in a slot formed by the moveable rod 440 and piston extension 430. The spring 495 is compressed within slot 494 by the moveable rod 440. The spring 495 is a bistable element and upon seeing sufficient compression force, will snap from the extended form (FIG. 17-A) to a flattened form (FIG. 17-B). Release of the compression force will allow the spring 495 to return ( FIG. 17-A).

The piston subassembly 449 and the movable rod 440 are linked in a physical and motion relationship, however there is a small degree of freedom along the axial direction between these parts. A single air cylinder and piston with movable rod subassembly can achieve (1) movement, (2) locking and (3) unlocking. However, the moveable rod 440 which slides within a space formed by the piston 443 and the piston extension 430, is now restricted by the force produced by the spring 495.

Dynamic Analysis of the Operation of the Release Mechanism

When the self-locking cylinder 418 retracts, the moveable rod 440 effectively becomes a piston 443 with seal 433. As the movable rod 440 retracts, the spring 495 force, Fs, holds the moveable rod 440 out and away from the piston subassembly 449. Reference is made to FIG. 17-A.

The spring force Fs provides a threshold force for the cylinder 418 as it moves. The moveable rod 440 remains seated relative to the piston subassembly 449, removing all locking forces from the balls 431. Any force from an external object is Fo. Thus Fo<Fs will result in continued motion of the cylinder 418. The steel balls 431 are trapped in a space between the locking sleeve 432 and the piston surface 443. The balls 431 are not able to physically contact the conical ring 438 of the movable rod 440 and the lock rod 434 simultaneously. The self-locking cylinder 418 continues this motion until a force Fo=Fs is exerted, externally, upon the movable rod 440.

When Fo=Fs the spring 495 inverts allowing the piston subassembly 449 to drive back away from the snap ring 437. The moveable rod 440 has stopped translation due to the forces Fo encountered. Reference is made to FIG. 17-B. The piston subassembly 449 moves the release pins 436 in a direction toward the balls 431. The locking sleeve 432 also moves toward the balls 431. The space that entraps the balls 431 collapses, forcing the balls 431 to contact the conical ring 438 of the movable rod 440 and the lock rod 434. Locking occurs automatically. Motion of the piston subassembly 449 stops when forces are balanced.

Increased force from the payload object 459 (Fr Sin A) will result in increased force between the lock rod 434, balls 431 and movable rod 440 resulting in a statically balanced condition. The movable rod 440 cannot translate in the extended direction, regardless of the magnitude of the force exerted on the movable rod 440 by the payload object 459.

The release of the self-locking cylinder 418 is accomplished when the piston means 443 moves the piston surface 496 in the extended direction. Reference is made to FIG. 17-B. Further motion of the piston 443 increases the negative force Fs on the balls 431 until they move in the extended direction.

$$Fs+Fr \sin A = uFr \cos A \quad uFn+Fspring$$

At this instant self-locking is terminated and the movable rod 440 begins to extend.

Fluid Dynamics Analysis of the Operation of the Self-Locking Cylinder

Fluid is introduced into the cylinder 418 through port 421 to achieve retracting and locking. The mechanical link between the piston means 443 and the movable rod 440 keeps the flow and motion of both parts synchronized. The fluid dynamic state continues as the cylinder 418 retracts and until such time as the movable rod 440 encounters an opposing force and stops extending motion. At that instant, the piston means 443 continues motion and self locking occurs. After self locking, the fluid achieves static balance.

Unlocking is achieved by reducing the fluid pressure at port 421 and increasing the fluid pressure at port 422. Fluid flows freely and rapidly through channel 424 and passes intersection 425. Fluid continues to flow through channel 428 and into the hollow center of the lock rod 434. A smaller diameter channel 428 increases the resistance and discourages flow into the center of the lock rod 434.

What is claimed is:

1. A multiposition self-locking cylinder comprising one or more;
   (a) structural enclosures containing a locking means;
   (b) piston means having a release part,
   (c) operating pins and a non-lock means, said release part and said locking means linearly moveable on a stationary rod means;
   (d) moveable rod means;
   (e) bearing means containing roller parts for establishing self-locking forces between said moveable rod means and said stationary rod means;
   wherein said moveable rod means is finitely lockable along said stationary rod means.

2. The multiposition self-locking cylinder according to claim 1 wherein said non-lock means comprises at least one slideably moveable pin to inhibit locking of the moveable rod means to the stationary rod means at full retraction of said moveable rod.

3. The multiposition self-locking cylinder according to claim 1 wherein said non-lock means comprises a moveable rod stop to prevent full extension of said moveable rod.

4. The multiposition self-locking cylinder according to claim 1 wherein said release part displaces said bearing means thereby detaching said moveable rod means from said stationary rod means.

5. The multiposition self-locking cylinder according to claim 1 wherein said roller parts of said bearing means is selected from the group consisting of a plurality of bearing balls, a plurality of cylindrical bearings and a plurality of spherical roller bearings.

6. The multiposition self-locking cylinder according to claim 1 wherein said stationary rod means is at least one right circular cylinder with a fluid passage running substantially through the length of the cylinder.

7. The multiposition self-locking cylinder according to claim 1 wherein said moveable rod means extends to a self-locked position or retracts to a self-locked position.

8. The multiposition self-locking cylinder according to claim 1 wherein said operating pins are rigidly attached to said piston means and slideably translate said release part.

9. The fluid power cylinder according to claim 8 wherein said piston means contains the release part that slideably displaces the bearing means thereby detaching said moveable rod means from said structural enclosure.

10. A multiposition self-locking cylinder comprising one or more;
    (a) structures containing a stationary rod means and a locking means;
    (b) piston means having a release part and a non-lock means, said release part and a locking means linearly moveable on said stationary rod means;
    (c) moveable rod means;
    (d) spring means operatively functioning between said piston means and said moveable rod means;
    (e) bearing means containing roller parts for establishing self-locking forces between said moveable rod means and said stationary rod means
    (f) operating pins rigidly attached to said piston means.

11. The multiposition self-locking cylinder according to claim 10 wherein said moveable rod means is capable of translating a finite distance relative to said piston means resulting in the mechanical locking of said movable rod means to said stationary rod means.

12. The multiposition self-locking cylinder according to claim 11 wherein said spring means is capable of exerting a force between said piston means and said moveable rod means resisting said mechanical locking.

13. The multiposition self-locking cylinder according to claim 10 wherein said spring means exerts a preloaded force between said moveable rod and said piston means thereby inhibiting mechanical locking until said cylinder mechanism exerts a predetermined force on a payload object.

14. The multiposition self-locking cylinder according to claim 10 wherein said non-lock means comprises at least one mechanical devise to stop translation of said moveable rod at substantially the same time that translation of the piston means is stopped by the structure.

15. The multiposition self-locking cylinder according to claim 10 wherein said release part displaces said bearing means thereby detaching said moveable rod means from said stationary rod means.

16. The multiposition self-locking cylinder according to claim 10 wherein said roller parts of said bearing means is selected from the group consisting of a plurality of bearing balls, a plurality of cylindrical bearings and a plurality of spherical roller bearings.

17. The multiposition self-locking cylinder according to claim 10 wherein said moveable rod means extends to a self-locked position or retracts to a self-locked position.

18. The multiposition self-locking cylinder according to claim 11 wherein said stationary rod means is at least one right circular cylinder with a fluid passage running substantially through the length of the cylinder.

* * * * *